(12) United States Patent
Sakakibara

(10) Patent No.: US 6,527,657 B2
(45) Date of Patent: Mar. 4, 2003

(54) ENDLESS BELT FOR POWER TRANSMITTING

(75) Inventor: Shiro Sakakibara, Toyokawa (JP)

(73) Assignee: Kabushikikasha Equos Research (JP)

( * ) Notice: Subject to any disclaimer, the term of this patent is extended or adjusted under 35 U.S.C. 154(b) by 0 days.

(21) Appl. No.: 09/745,438

(22) Filed: Dec. 26, 2000

(65) Prior Publication Data

US 2001/0019978 A1 Sep. 6, 2001

(30) Foreign Application Priority Data

Dec. 28, 1999 (JP) ............................................. 11-375805
Dec. 5, 2000 (JP) ........................................ 2000-370539

(51) Int. Cl.⁷ ................................................. F16G 5/16
(52) U.S. Cl. ....................................... 474/245; 474/242
(58) Field of Search ................................. 474/245, 242, 474/201, 244

(56) References Cited

U.S. PATENT DOCUMENTS

| | | | |
|---|---|---|---|
| 4,545,779 A | 10/1985 | Sakakibara et al. | 474/240 |
| 4,650,444 A | 3/1987 | Sakakibara et al. | 474/201 |
| 4,655,735 A | 4/1987 | Sakakibara et al. | 474/245 |
| 4,737,137 A | 4/1988 | Miyashi | 474/245 |
| 4,822,323 A | 4/1989 | Sakakibara et al. | 474/242 |
| 4,838,844 A | 6/1989 | Sakakibara et al. | 474/240 |
| 4,878,887 A | 11/1989 | Sakakibara et al. | 474/245 |
| 4,898,568 A | 2/1990 | Sakakibara et al. | 474/245 |
| 4,919,645 A | 4/1990 | Sakakibara et al. | 474/245 |
| 4,979,930 A | 12/1990 | Sakakibara et al. | 474/242 |
| 5,007,883 A * | 4/1991 | Cole, Jr. et al. | 474/242 |
| 5,090,947 A * | 2/1992 | van Rooij | 474/240 |
| 5,215,505 A * | 6/1993 | Sugimoto et al. | 474/242 |

FOREIGN PATENT DOCUMENTS

JP 07-091498 9/1993

* cited by examiner

*Primary Examiner*—Matthew C. Graham
*Assistant Examiner*—Mariano Sy
(74) *Attorney, Agent, or Firm*—Lorusso & Loud

(57) ABSTRACT

An endless belt for power transmitting according to the present invention is a tension-type belt of links forming a chain, and has high power transmitting efficiency although it can be produced with relatively low cost. With this endless belt, the respective blocks and pins start to contact sheave sides in order near the pitch line and the pitch of biting into the sheave is made smaller so as to reduce noise. Even if the respective blocks are inclined when the endless belt bites into pulley, each block contacts the sheave sides only at projecting outer end faces formed extending over a limited area corresponding to the divided pin near the pitch line (P-P). Therefore, a total of four parts, the projecting outer end faces of the first and second blocks and a pair of the divided pins, abut the sheave side in order, in one pitch of the link chain, so as to make the biting pitch smaller and decrease polygon effects.

18 Claims, 33 Drawing Sheets

Fig.8
(a)
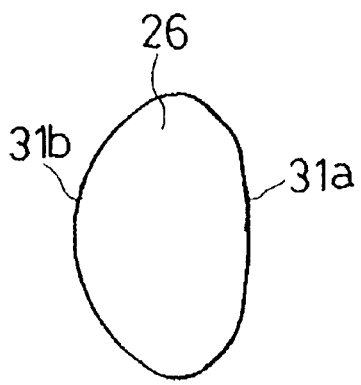
(b)
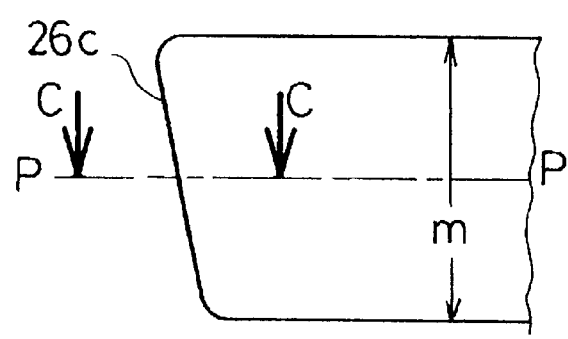
(c)
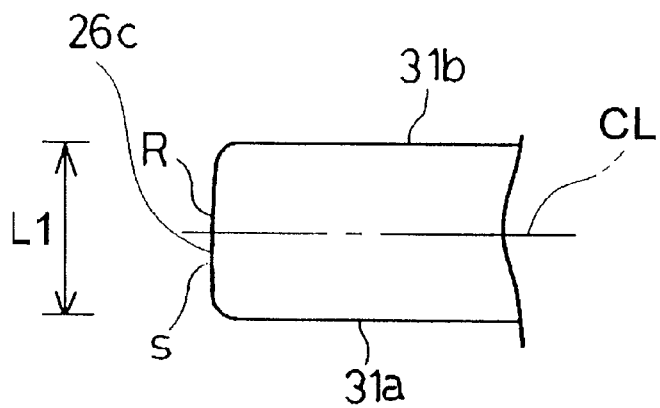

Fig. 10
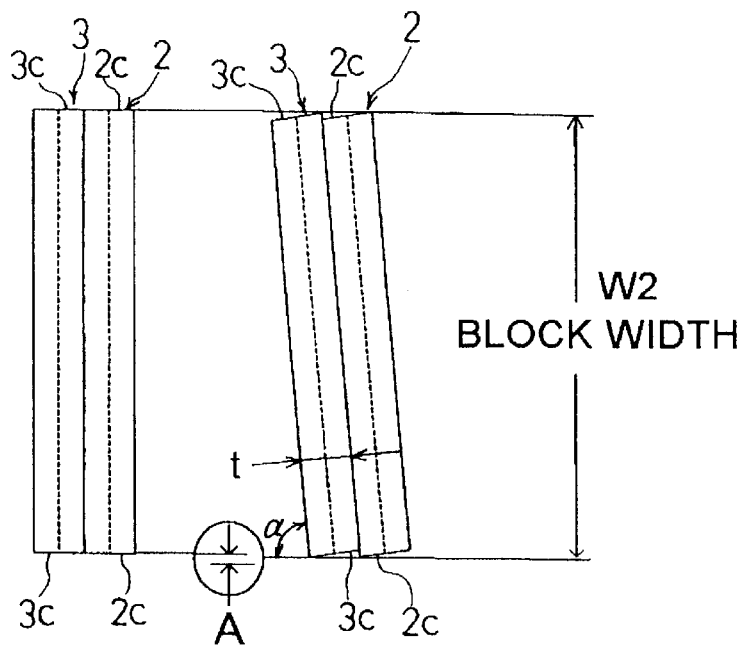
(a) PRIOR ART
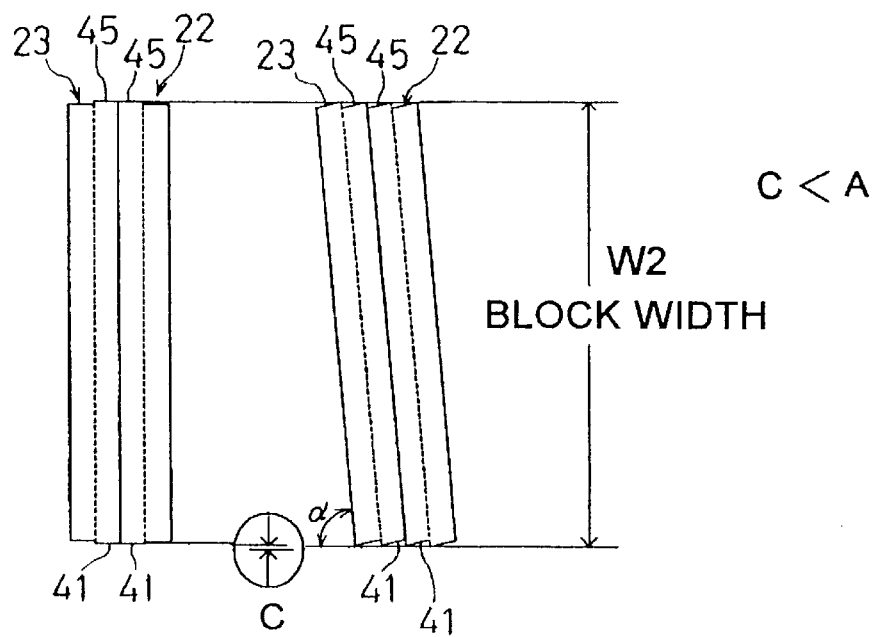
(b) PRESENT INVENTION

Fig. 14
(a)
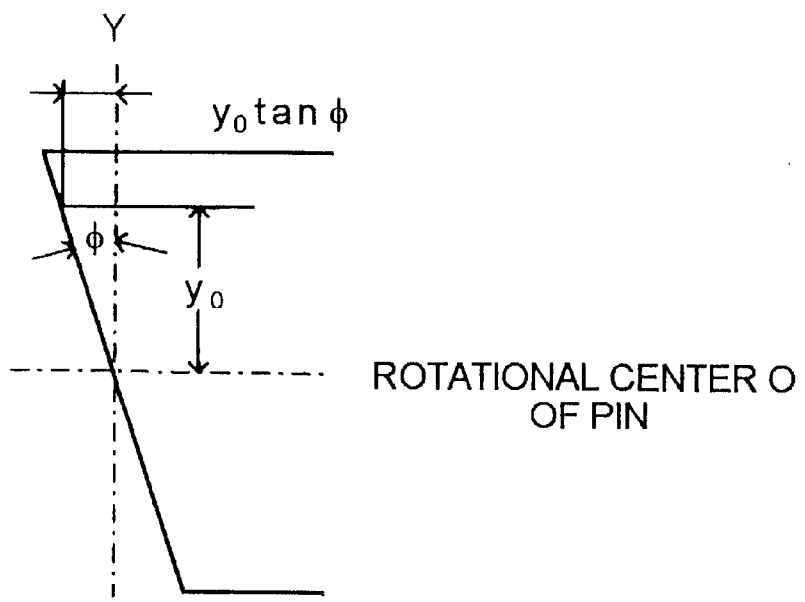
ROTATIONAL CENTER O OF PIN
(b)
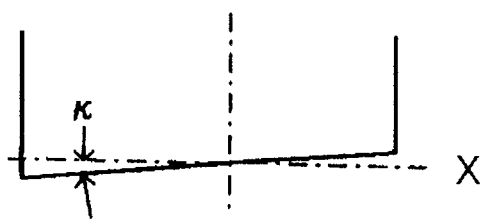

CLEARANCE δ BETWEEN PIN AND SHEAVE (BOTH SIDES)
—SHAPE OF END FACE FLAT, X COORDINATES, $y_0 0$, PULLEY $R_0$ THE MAXIMUM

CLEARANCE δ BETWEEN PIN AND SHEAVE (BOTH SIDES)
—SHAPE OF END FACE Rp10·a0, X COORDINATES, y0 0, PULLEY R0 THE MINIMUM

CLEARANCE δ BETWEEN PIN AND SHEAVE (BOTH SIDES)
—SHAPE OF END FACE Rp10·a0, X COORDINATES, $y_0$–1.5, PULLEY $R_0$ THE MINIMUM

Fig.23 CLEARANCE δ BETWEEN PIN AND SHEAVE (BOTH SIDES)
—SHAPE OF END FACE Rp10·a-0.1, X COORDINATES, y₀ 0, PULLEY R₀ THE MINIMUM

CLEARANCE δ BETWEEN PIN AND SHEAVE (BOTH SIDES)
—SHAPE OF END FACE Rp10·a0.1, X COORDINATES, y₀ 0, PULLEY R₀ THE MAXIMUM

ENDLESS BELT FOR POWER TRANSMITTING

FIELD OF THE INVENTION

This invention relates to an endless belt used for power transmission to be used for a belt-type continuously variable transmission (CVT), especially to an endless belt for power transmitting, connecting link plates by pins.

DESCRIPTION OF THE PRIOR ART

One such endless belt for power transmitting has been developed by Van Doorne's Transmissie (VDT) in the Netherlands (VDT; see, for example, Japanese Patent No. 1105154). The VDT belt has layered steel bands with metal V-shape blocks inserted therebetween, and power is transmitted by contact between the sides of the V-shape blocks and sheave faces of primary and secondary pulleys.

In this VDT belt, biting pitch and polygon variation can be reduced by making the V-shape block thinner, and the VDT belt is noiseless. But, the above-mentioned layered steel belt is made of high price material, and should be produced at high accuracy. Besides, in this steel belt, slip loss occurs between steel belt layers in power transmission.

In order to solve the above-mentioned problems, an endless belt for power transmission as shown in Japanese Kokai publication number H7-91498, for instance, has been proposed. As shown in FIG. 1, the metal belt is comprised of a plural number of first and second blocks 2, 3 located in a constant order in the longitudinal direction of a belt 1, a plural number of link plates 5 which connect these blocks through pins 6 which are divided into two pins (rocker pins) 6a, 6b, and spring means 7 stretching in the longitudinal direction of the link plate by engaging with these pins 6. This endless belt for power transmission has three open holes 9, 10, 9 formed in the first and second blocks 2, 3, and the link chain 11 is seated in these open holes 9, 10, 9. Since the pin 6 is engaged with the blocks 2, 3, the blocks 2, 3 and the link chain 11 are mutually connected to form an endless chain.

Projections 2a, 3a are formed so as to provide abutting surfaces between the first and the second blocks 2, 3 and, on the opposite sides of the blocks 2, 3 are slots 2b, 3b for receiving divided pins 6a, 6b. Within the first and second blocks 2, 3, the divided pins 6a and 6b are engaged with each other at their intermediate portions a, a and a predetermined clearance is formed at their outer end portions b, b. The pins 6a, 6b are engaged with the pin engagement slots 2b, 3b formed on the intermediate portions a, a so as to support each block 2, 3 with each block being free to oscillate with respect to the pins 6a, 6b.

The outer side faces 2c, 3c of each block 2, 3 are inclined so as to adjust on the sheave side face of each pulley. Both outer end faces 6c of the pins 6 may be inclined for adjusting to the sheaves. The pin end face 6c has R form orthogonal to the longitudinal direction of the belt, such as A—A section, for instance, and can contact with the sheave face on a pitch circle of the belt.

In the present endless belt 1 for power transmitting, torque is transmitted in such a manner that the torque of a pulley unit is transmitted from the sheave side face by contact with the first and the second blocks 2, 3 and the pin 6, and tensile force acts on the link chain 11 comprising the link plates 5 through the pins 6.

In the above described metal endless belt 1, both side faces 2c, 3c of the first and the second blocks 2, 3 are formed in the shape of almost a straight line; however, they may be shaped as an arc in which case they contact the sheave side along a straight line by elastic deformation. As the belt 1 begins to curve by biting into the pulley, changing from the straight line travel, then, both side faces of each block can start to contact the sheave side at any position along its radial dimension. The contact start position in the longitudinal direction of the belt changes in accordance with the position of the block in the radial direction.

For this reason, the blocks may start to contact with the sheave at their upper portion or lower portion, as determined by the shape of the side surfaces of the blocks 2, 3, with respect to the X-axis, the Y-axis or the Z-axis (as shown in FIG. 1, the longitudinal direction of the belt is X-axis, the right and left direction is Z-axis, and the up and down direction is Y-axis) and/or by the deformation of the sheave side and the block. The contact start position of the blocks 2, 3 with the sheave in the longitudinal direction of the belt overlaps the pin 6. That is, the contact of the blocks 2, 3 with the sheave and the contact of the pin 6 with the sheave occur simultaneously.

In order to decrease undesired noise at the time of biting into the pulley by the metal endless belt 1, it is preferable to make the biting pitch (contact start position interval in the circumference direction) as small as possible, and to decrease the angle between the adjacent belt contact positions with respect to the pulley center, that is, polygon variation (polygon effects). But, when the position of start of contact of the block with the sheave overlaps the pin as mentioned before, the angle between adjacent contact points increases, shifting the angle to be originally held between the block and the pin. Then, the biting pitch is increased to that extent, and undesired noise is increased.

On the other hand, if the shape of the end faces of the divided pins 6a, 6b is a flat face along the side of the sheave or is the R shape with respect to the face orthogonal (radius direction) to the longitudinal direction of the belt, as in the above-mentioned prior art, above-mentioned (The R shape in the direction is the shape along the side of the sheave on the pitch circle, and is substantially the same as the above-mentioned flat face concerning the rotation of the pin at the time of biting), the relative clearance between the pin and the sheave is changed by the spin (rotation) of the pin when the belt bites into the pulley and the blocks and the divided pins are rotated to fit the effective diameter of the pulley. Then, the contact position between the pin and the sheave (in the circumferential direction and radial direction) is changed (change of the position where the pin starts to bite), and the above-mentioned polygon effects occur so as to cause undesired noise. At the same time, slip of the pin with respect to the sheave, especially the slip in the radial direction, increases.

Furthermore, by contacting the pin with the sheave at the position away from the rotational center of the pin, spin loss increases with the spin (rotation) of the pin. Besides, power loss occurs due to the change of the relative clearance between the pin and the sheave, especially by the slip in the radial direction, so as to reduce the power transmitting efficiency.

Thus, the first object of the present invention is to provide an endless belt for power transmission which is a tension-type belt using a link chain, having a high power transmitting capacity, which can be produced with relatively low cost, and having such a structure that the respective blocks and pins start to contact with the sheave side in order near the pitch line and the biting pitch into the sheave is made smaller so as to reduce noise.

The second object of the present invention is to provide an endless belt for power transmission, reducing the variation in pin width due to the rotation of the pin when the endless belt bites into the pulley so as to reduce undesired noise by the polygon effects and power loss by the spin of the pin.

SUMMARY OF THE INVENTION

The present invention provides an endless belt for power transmission having a plurality of divided pins (pin pairs) with rolling surfaces for abutting each other, a plurality of link plates comprising link chains alternately connected by said pins, and first and second blocks having projections capable of abutting each other, a concave slot provided on the side of each block, opposite the projection, for receiving one of the divided pins, and an open hole through which the link chain extends, front to rear, in the longitudinal direction. The divided pins have a shape and length such that both outer ends contact the sheave sides of a pulley. The first and second blocks have projecting outer side faces at positions approximately corresponding to the outer end faces of the divided pins and are shaped to contact the sheave sides of the pulley. Thus, the endless belt is structured so that a total of four parts, i.e., a pair of divided pins and the projecting outer side faces of the first and second blocks contact the sheave sides, in this order, in one pitch of the link chain.

The area of contact between the block and the sheave side is limited to within predetermined bounds near the pitch line corresponding to the position of the pin. Even if the sheave is bent or the block is inclined, a total of four parts, i.e., a pair of divided pins and the projecting outer end faces of the first and second blocks contact the sheave within one pitch of the link chain so as to make the biting pitch smaller and to decrease polygon effects. Therefore, in the endless belt for power transmitting, undesired noise can be decreased, although it is a tension-type chain comprising the link chains and blocks and having high power transmitting efficiency, and can be produced with relatively low cost.

Besides, even if the blocks are inclined with respect to the front and rear direction (in the longitudinal direction of the belt; the Z-axis), the variation of the effective block width due to the inclination is small, the load on the sheave is small, and adverse influence on the durability of the pulley and the block is reduced since the bounds of contact between the block and the sheave sides are restricted.

In one preferred embodiment of the present invention (see FIG. 7, for instance) the projecting outer end faces of the first and second blocks are formed in the shape of almost a straight line, having a predetermined inclined angle (they may alternatively be arced, and may contact the sheave side with elastic deformation) so as to match that of the sheave sides, are near the pitch line, and are shorter than the length in the radial dimension of the concave slot.

In another preferred embodiment of the invention, the projecting outer side face of the block is almost planar at an inclined angle predetermined to secure a contact area with the sheave side. In spite of this, the biting position of the block with respect to the pin can be correctly maintained.

In yet another embodiment (as shown in FIG. 9(B), for instance), the first and second blocks have concave slots for holding and contacting the divided pins on both of opposing sides facing longitudinally of the belt. These slots form an open hole therebetween.

In still another preferred embodiment, the concave slots for holding the pin and the projections contacting each other are formed at the opposing surfaces of the block facing longitudinally of the belt. Then, the length of the concave slot and that of the projection are set so as to improve bearing of load stress by the block. The length of the open hole extending between those opposing surfaces, and the number of the link plates of the link chain within the open hole are set so as to improve torque capacity and durability.

The divided pin is preferably located in the slot in a manner to develop a moment by contact with the concave slot to counteract a moment acting on said first and second blocks in contact with the sheave sides at their outer side face projections. Thus, the moment acting on each block in contact with the pulley is countered by the moment developed by the contact between the pin and the concave slot so as to resist change of position of the blocks.

Preferably, the position where the divided pin abuts the concave slot is located at a position shifted radially outward with respect to the pitch circle of the belt. In this manner, a moment is easily generated in a direction opposite to the moment acting between the block and the pulley.

Preferably, the outer end faces of the divided pin are formed curved in the longitudinal direction of the belt so as to contact the sheave side near the apical portion of the curved face. This prevents the top end side, in the belt running direction, of the outer side end face of the divided pin from first contacting with the sheave side so as to make the biting pitch bigger. In this manner noise is reduced.

Guide faces may be respectively formed on the open hole side of the block side portions, radially inward and outward of said concave slots, to abut the outermost sides of the link chain. Such guide faces allow the block to smoothly oscillate on the link plates, so noise is reduced.

Preferably, a stopper, for restricting the extent of relative rotation of the divided pin, is provided on opposing sides of the concave slot. Thus, the extent of rotation of the block with respect to the pin is held within predetermined bounds, and interference among the blocks can be reduced.

In one embodiment the outer end face of the divided pin is formed in the shape of a straight line having a predetermined inclined angle, as seen from said longitudinal direction of said belt. In this manner the end face of the divided pin and the sheave side can be smoothly contacted with each other.

In another preferred embodiment of the present invention, the end face of the pin has a curved shape at least in the X direction so that the variation of the pin length with rotation of the pin as the pin bites into the pulley is smaller, as compared with a pin having a flat end face or an end face curved in the Y direction, and the polygon effects are decreased. At the same time, lengthwise deformation of the pin and the sheave is decreased and their durability is improved. Further, slip between the pin and the sheave, especially slip in the radial direction and rotational slip (spin loss) are decreased, thereby decreasing power loss and improving power transmitting efficiency.

More preferably, the shape of the pin end face is almost cylindrical, having a curved shape in the X direction. Accordingly, two-dimensional grinding is sufficient to produce the pin end face, and its manufacture is simplified in comparison with the case where the pin end face is machined into a spherical shape and its machining efficiency can be improved. Furthermore, the influence on the effective length of the pin by the curved shape in the X direction is larger in comparison with a face curved in Y direction. Even if the pin end face is made cylindrical in the X direction only, there is no big influence on the noise of the belt in actual use or in power efficiency. Besides, by making the pin end face cylindrical, Hertz stress is reduced in comparison with a spherical shape.

Each pin is preferably a pair of divided pins having rolling surfaces abutting each other, so as to decrease power loss.

The end faces of the pin are preferably curved with a radius (Rp) of 5–15 mm. With the curved shape (R shape) having a radius of 5–15 mm, the strength with reduction of the above-mentioned Hertz stress can be maintained, and the variation of the length with the pin rotation is restricted within bounds compatible with belt efficiency.

More preferably, the end face of the divided pin has a displacement ("discrepancy") (a, aA) of the center of radius (Rp) with respect to the rotational center (0) of the pin so that variation ($\epsilon$) of effective pin length provides a clearance ($\delta$) between the pin end face and the sheave in the X direction, which clearance is equally distributed to the positive rotational side and the negative rotational side of rotational angle ($\theta$) in variation ($\eta$a) of the rotational angle through which the pin rotates. Thus, the shape of the pin end face can be designed so as to make the variation of the pin length minimal, thereby providing a highly efficient endless belt, with decreased noise and power loss.

Most preferably, the discrepancy is from −0.2 to +0.2 mm. Within the range of −0.2 to +0.2 mm, the variation of the pin width can be restricted so as not to greatly influence the angle of the link plate of the divided pin.

However, the discrepancy should not be 0. When the discrepancy between the center of the radius (X coordinates) of the R shape of the pin end face with respect to the rotational center of the pin is 0, the variation of the pin length in the bounds of the change of the rotational angle of the pin is the maximum rotational angle of the pin (the same as the angle of the link plate of the pin) at the position where the belt starts to bite into the pulley, and is smaller in the rotational angle of the pin where the belt is rotated and the rotation of the pin finishes in the divided pin of the front side in the moving direction of the belt. As a result, the variation of the pin length is increased within the bounds of the change of the rotational angle of the pin. When the discrepancy does not include 0, that is, when the rotational center of the pin and the center of the radius (X coordinates) of the R shape of the pin end face do not correspond with each other, i.e., the shifted direction is on the positive or negative side with respect to Y axis for the center of the radius of the pulley, the variation of the pin width can be restricted to a smaller value within the bounds of the change of the rotational angle of the pin.

The divided pins extend through a sheet hole formed in the link plate with the side opposite the rolling surface abutting the link plate. A pair of divided pins seated within the link plate with a predetermined value (f; 5°, for instance) of positive rotation with respect to Y direction orthogonal to said X direction, with rotation in the moving direction of the endless belt being positive rotation. The leading half of the divided pin is preferably attached to the link plate at a predetermined rotational angle in the positive rotational direction. Then, when the endless belt bites into the pulley, the divided pin is rotated in the negative rotational direction, from the predetermined positive angular position it occupies, when the belt is in an almost straight line, to a predetermined angle of negative rotation upon finishing biting into the pulley. The rolling surfaces of the divided pin on both sides holding the center line is advantageous for strength.

Preferably, the center of the radius (Rp) of said R shape of the leading half of the divided pin is located a predetermined distance ("discrepancy") (aA) to the trailing side of the rotational center (0) of the pin. In this manner, the variation of the pin length can be restricted to a small value within the rotational angle of the link plate relative to the divided pin.

Preferably, the radius of the R shape is almost 10 mm, and the predetermined discrepancy (ah) is almost 0.03 mm to provide an optimum shape for the pin end face. In practice, the minimum effective diameter of the pulley is about 28 mm and the maximum effective diamter of the pulley is about 69 mm in order that the variation of the pin length be kept at a minimum.

Preferably, the blocks have transverse projections at positions near the pitch line approximately corresponding to the end faces of the pin at both right and left outer side faces, and have a shape mating with the sheave sides (V) of the pulley.

Preferably the blocks consist of first and second blocks, having projections contacting each other in the X direction (running direction of belt) and a concave slot for receiving the divided pin on the opposite the projection. A total of four parts, i.e., the end faces of the pair of divided pins and the said projections of the side faces of the first and second blocks, contact the sheave sides, in this order, in one pitch of the link chain. In this manner, the biting pitch is made smaller, and polygon effects are decreased. Therefore, an endless belt having superior efficiency, decreased noise and improved durability, can be provided, even though a tension-type endless belt. Further, power transmitting efficiency is high and the belt can be manufactured at relatively low cost. Even if the sheave is bent or the respective blocks are inclined with respect to the X-axis, the Y-axis, or the Z-axis at the time of biting into the pulley, each block contacts the sheave side only on the side projections formed at predetermined positions near the pitch line (P—P) and corresponding to the divided pin. Accordingly, the variation (C) in the block width (B) is smaller than with the conventional one.

On the contrary, the conventional blocks (2), (3) contact the sheave sides, over almost the whole radial length of the outer side faces (2c), (3c). Also, the width of the contacting area (t) of the block including the projection portions (2a), (3a) is wider. When the respective blocks (2), (3) are inclined (that is, with respect to the Z-axis) in the longitudinal direction X of the belt, as shown in FIG. 10(a), for instance, the wide contacting area (t) influences the variation A of the effective block width so that the variation becomes larger.

On the other hand, the divided pins are rotated, fitting the curve of the links with the biting of the endless belt into the pulley. The opposing end faces of the pin have a shape whereby the variation ($\epsilon$) of the pin length (B) due to the rotation of the pin is small. Accordingly, the biting pitch of the pin end face into the sheave is maintained constant, the polygon effects are maintained small, noise is reduced, and the influence on the sheave by the rotational angle of the pin and the influence on the block are decreased so as to improve the durability of the belt-type continuously variable transmission. Moreover, the power transmitting efficiency is improved with the reduction in the spin loss of the pin.

The numerals and the marks which appear in parenthesis in this description are for convenience in reference to the drawings and are not intended to influence the scope of the present invention, as defined by the appended claims.

BRIEF DESCRIPTION OF THE DRAWINGS

FIGS. 6(a)–6(e) are views of parts of the endless belt for power transmitting according to the present invention, wherein FIGS. 6(a) and 6(b) show a block, FIG. 6(c) shows a link plate, and FIG. 6(d), and FIG. 6(e) show spring means;

FIG. 8(a) is an enlarged side view of a divided pin, FIG. 8(b) is a front view and FIG. 8(c) is a sectional view taken along C—C in FIG. 8(b);

FIGS. 9(a)–9(f) are views comparing components of the present invention (shown with full line) with the corresponding components of a conventional belt (shown with dashed line), wherein FIGS. 9(a) and 9(b) are front and side views, respectively, of a link plate; FIGS. 9(c) and 9(d) are front and side views, respectively, of a block; and FIGS. 9(e) and 9(f) are front and side views, respectively, of a pin;

FIG. 10(a) is a plan view showing a conventional block inclined in the front and rear directions, and FIG. 10(b) is a similar view of a block of the present invention;

FIG. 14(a) shows the Y dimension (radial dimension) of the end face of the pin; and FIG. 14(b) shows the X dimension (circumference) when the R shape of the end face of the pin is inclined relative to the X and Y axes;

DESCRIPTION OF THE PREFERRED EMBODIMENT

Embodiments of the present invention will now be explained with reference to the accompanying drawings.

Figure 1:
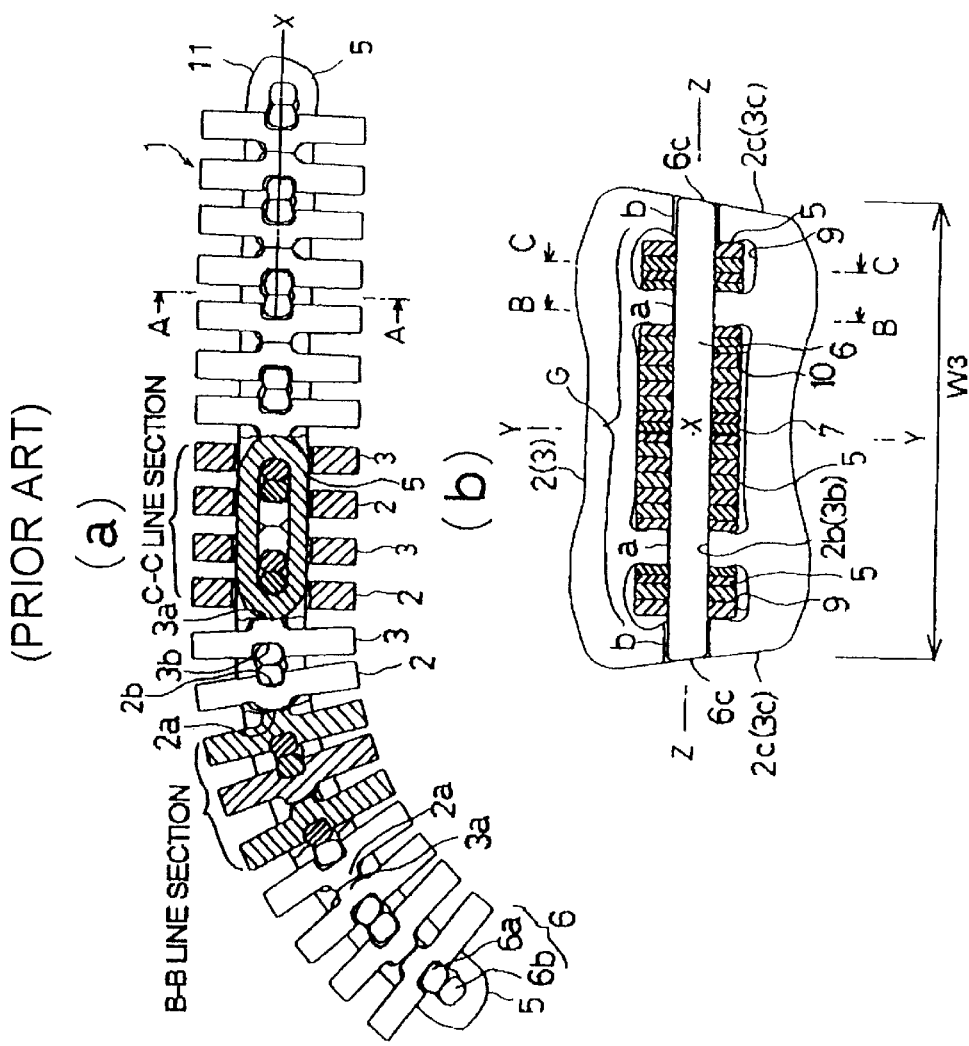
FIG. 1(a) is a side view of a conventional endless belt for power transmission, sectioned in part (B—B section and C—C section of FIG. 1(b))
FIG. 1(b) is a A—A sectional view of (a)
Figure 2:
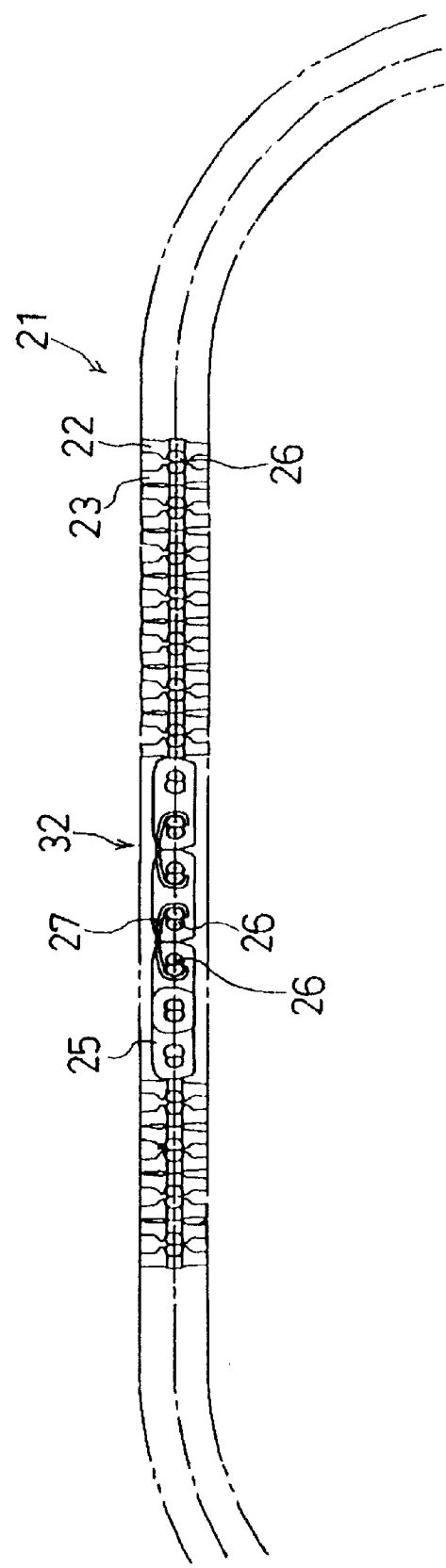
FIG. 2 is a side view showing a section of the endless belt, including a straight run between pulleys, for power transmission according to the present invention.

Referring to FIGS. 2–5, an endless belt for power transmitting 21 has a plural number of first and second blocks 22, 23 arranged in a repeating sequence in the longitudinal direction of the belt, a plural number of link plates 25 and pin sets or "pins" 26 for connecting these link plates 25, and spring means 27 stretching in the longitudinal dimension ("X" axis) of the link plate 25 by engagement with these pins, similar to the belt 1 in FIG. 1.

Figure 3:
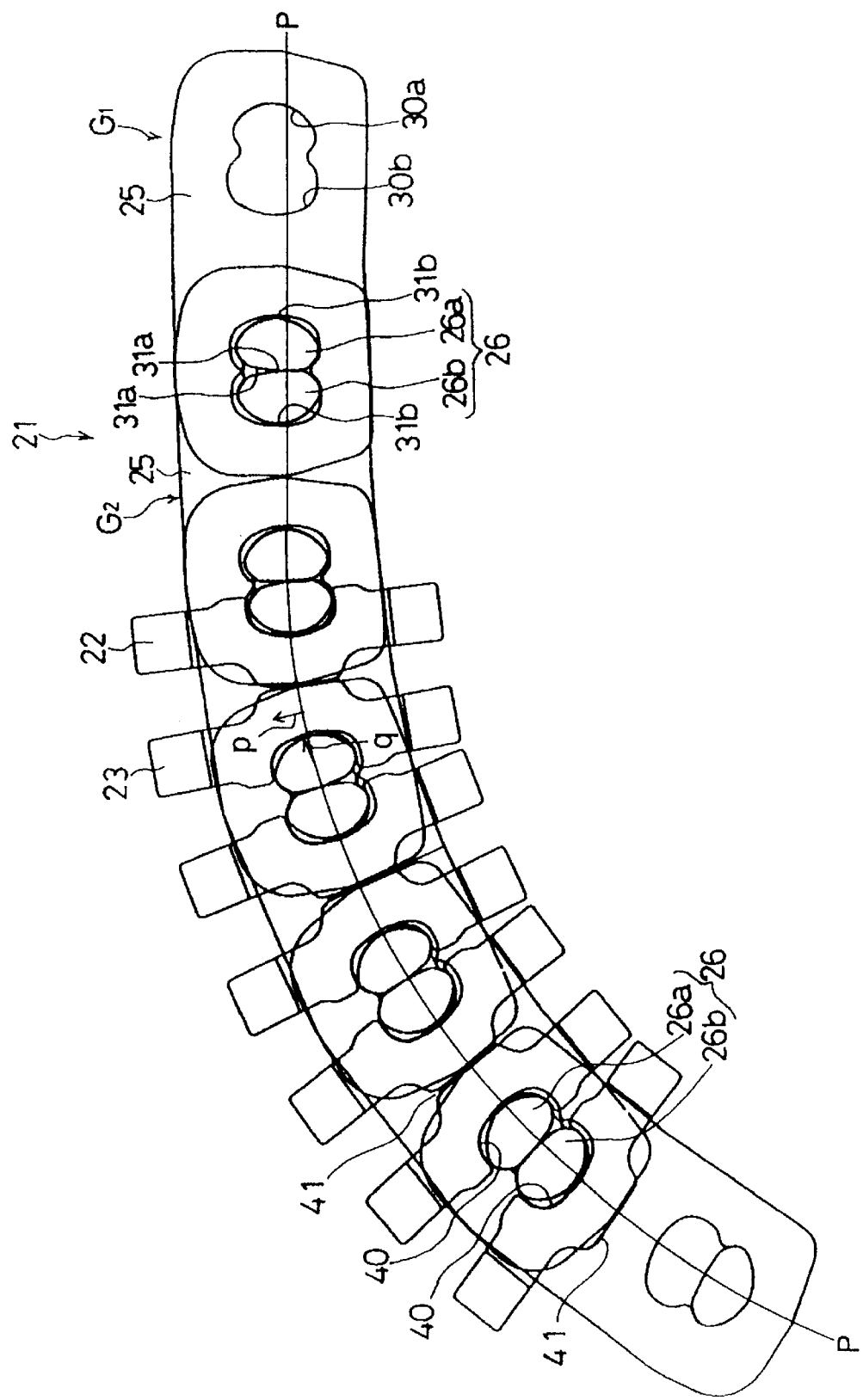
FIG. 3 is an enlarged side view showing a portion of the endless belt of FIG. 2 as it starts to pass around a pulley.

The link plate 25 is a steel plate having a predetermined shape, as shown in detail in FIG. 3 and FIG. 6(c) and, at both ends, a pin hole 30, comprised of hole portions 30a, 30b for receiving a pair of divided pins 26a, 26b, respectively. Each pin set 26 is comprised of a pair of divided pins (rocker pins, sheet pins) 26a, 26b which are symmetrical as mirror images and which have opposing faces serving as rolling surfaces 31a. Further, each pin 26 engages the link plate a by contacting a side face 31b, opposed to its rolling surface, within the sheet hole 30a in the link plate 25. A link chain 32 of parallel ranks of link plates 25 is formed by alternately connecting the respective link plates 25 with the pin sets 26.

And, as shown in FIGS. 2, 4, 5 and 6(d) and (e), spring means 27, having a C shape in side view, is provided extending between adjacent pins 26 within the central portion of rank G which is one lateral section of the link chain 32. The spring means 27 is provided within every other rank G and, with its spring force acting on each pin 26, frictional force is increased between the block and the link plate contacting each pin. The pins are prevented from shifting in the axial direction (transverse of chain—"Z" axis) and dropping out by frictional force, especially when the belt is being assembled and when the belt is loosened.

Figure 5:
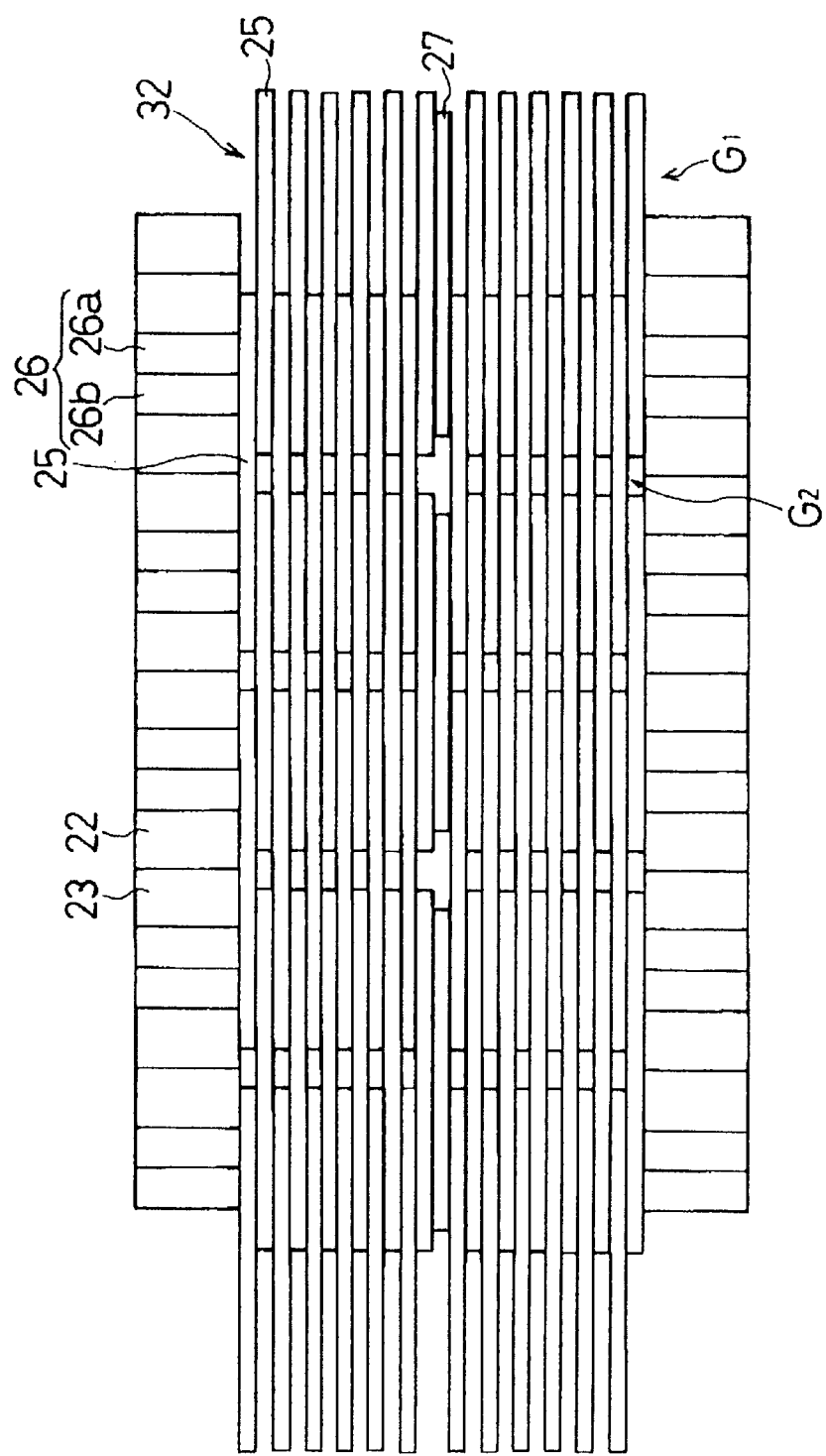
FIG. 5 is a plan view of FIG. 3.

As shown in FIG. 3 and FIG. 5, one divided pin 26a is seated in the sheet hole 30a of the link plate 25 of a lateral rank $G_1$ so as not to rotate, and the other divided pin 26b is seated in the other hole 30b, with a clearance in the hole. Another divided pin 26b is seated in the sheet hole 30a of the link plate 25 of the rank $G_2$ adjacent to the rank $G_1$ so as not to rotate. By rolling contact between surfaces 31a of pins 26a, 26b, the ranks $G_1$ and $G_2$ can be pivoted relative to each other. By doing so, the endless belt 21 is wound around the effective diameter of the pulley set, which effective diameter is determined by the spacing between a pair of sheaves and which is changed for stepless speed change.

Figure 4:
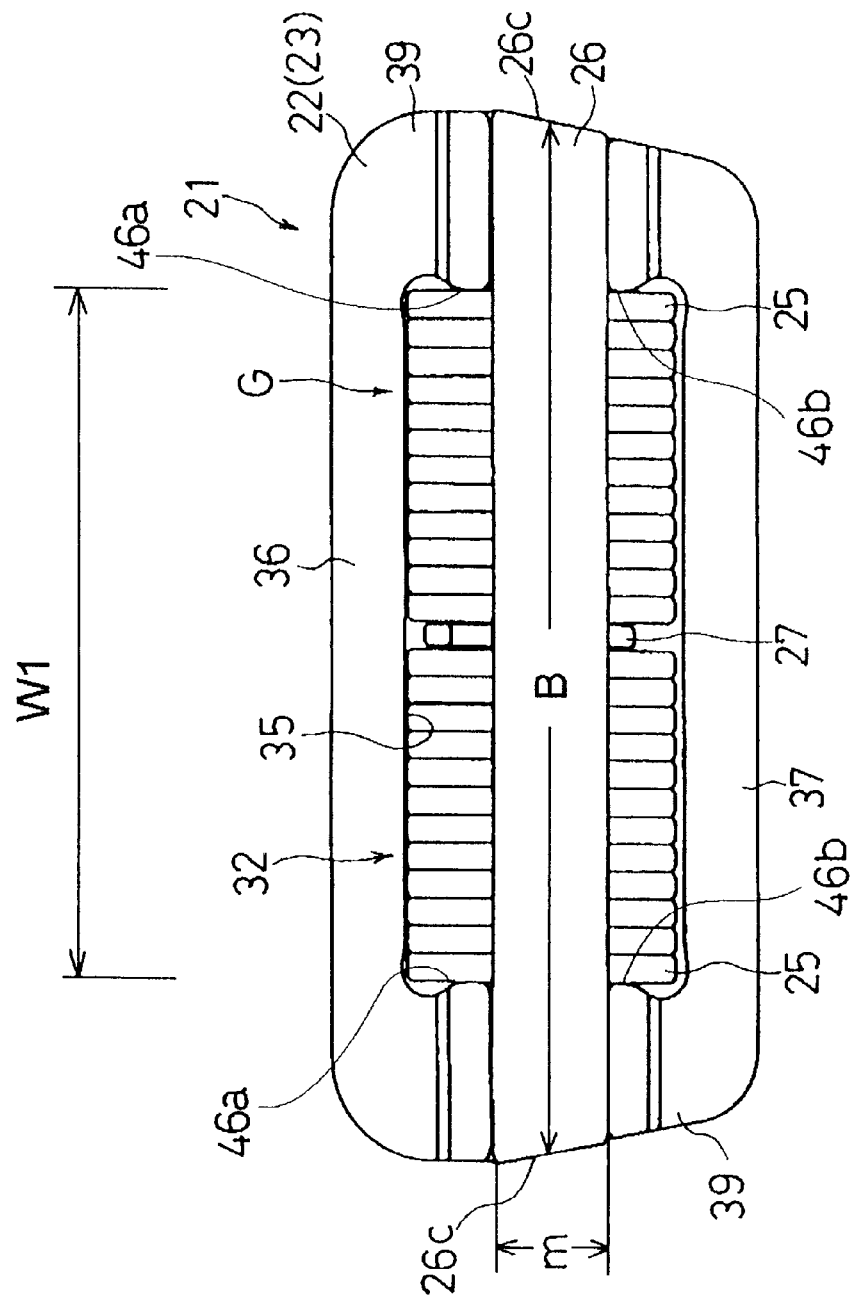
FIG. 4 is a front sectional view of FIG. 3.
Figure 6:
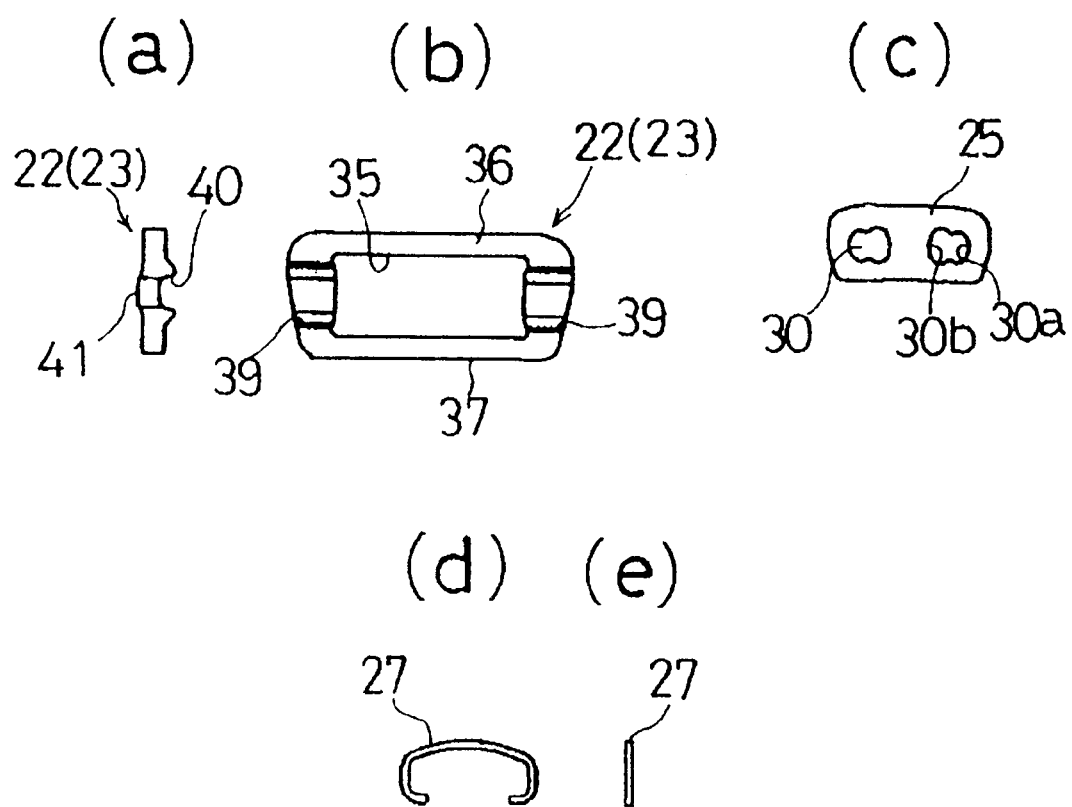

The pin 26 extends, projecting transverse ("Z" axis/dimension) of the rank G . . . , and abuts on the first and the second blocks 22, 23, as shown in FIGS. 4 and 5. The first and the second blocks have mirror symmetry. As shown in FIGS. 4 and 6, the block 22 (23) has an open hole 35 of almost rectangular shape in its central portion, and has an upper side portion 36, a lower side portion 37 and right and left side portions 39, 39. The link chain 32 extends through the open hole 35, and the block 22 abuts on the pin 26 at its right and left side portions 39, 39.

Figure 7:
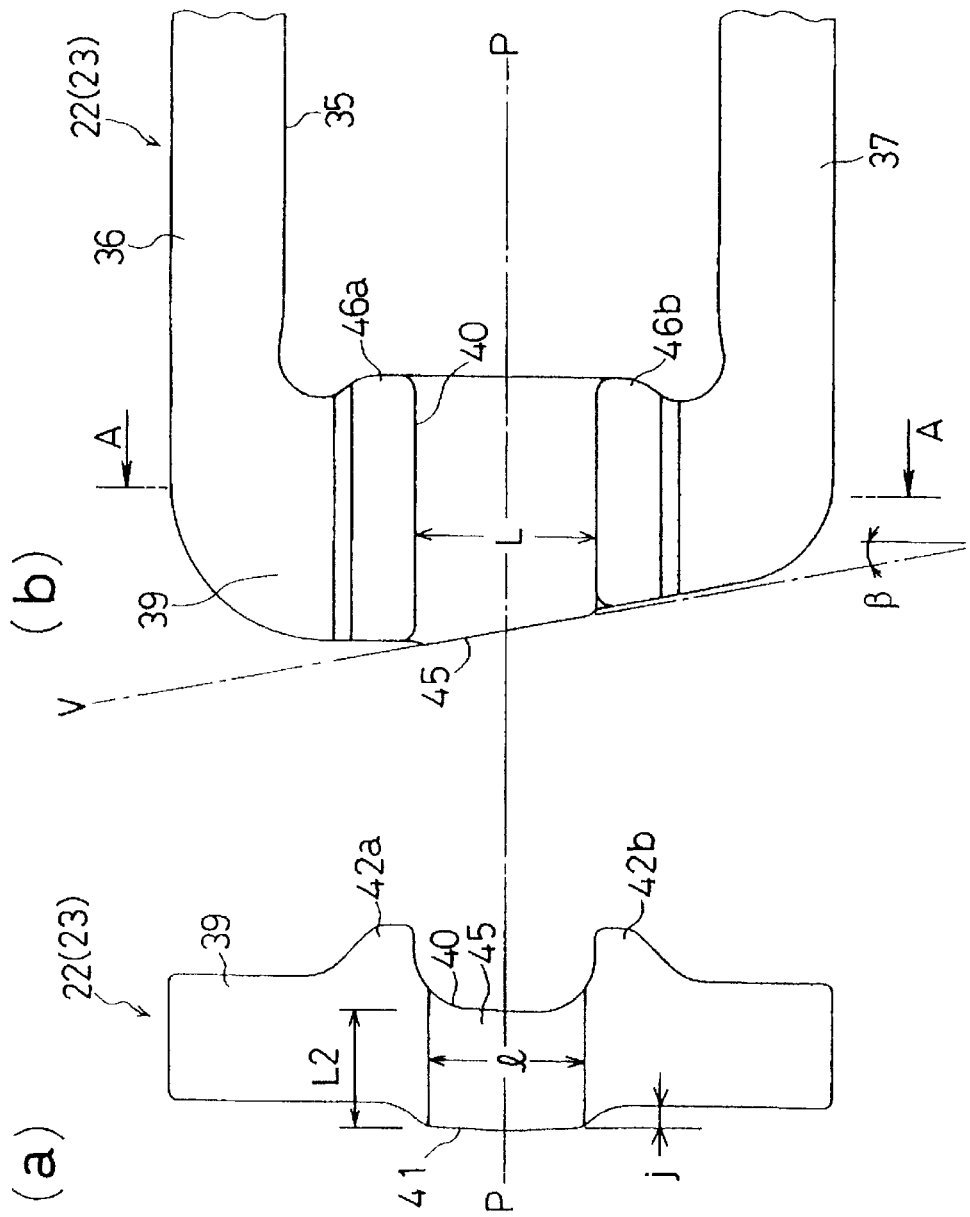
FIG. 7(a) is a sectional view taken along A—A in FIG. 7(b)
FIG. 7(b) is a front view of a block.

As shown in FIG. 7 in detail, the block 22 (23) has a concave slot 40 formed on one side face in each of its right and left side portions 39, and has a projection 41 formed on its opposed face, so that the wall thickness of the block is almost constant in its radial dimension ("Y" axis/dimension). One of the divided pins 26a, 26b is received in the concave slot 40, and the concave slot 40 abuts the pin near its center. The upper and lower faces of the concave slot are formed in an arc shape and spaced so as to permit relative rotation between the block and the pin. Furthermore, projections 42a, 42b, extending longitudinally of the belt serve to hold the pins 26a, 26b on the upper and lower faces of the concave slot 40. By the engagement between the projections and the pin, the rotation of the block 22 (23) relative to the pin is restricted. Then, the projecting dimension j of the block 22 (23) is small, consistent with the objective of maintaining the minimum winding angle on the pulley.

As shown in FIG. 7(b) in detail, an outer side face 45 of the concave slot 40 portion in the block 22 (23) projects a predetermined transverse distance (in the axial ("Z" axis) direction of the pin). The projecting outer side face 45 is inclined at an angle β, almost the same as the angle of inclination of the sheave side V, and only projecting outer side face 45 can contact the sheave side on the block outer side 39. The projecting outer side face 45 is positioned to almost correspond to one end 26c of the divided pins 26a, 26b. The projecting outer side face 45 has a substantially planar shape (or may be a big arc substantially contacting the sheave side by elastic deformation or the like) at a predetermined inclined angle β relative to the radial "Y" dimension so as to mate with the sheave side V, that is, it has a substantially flat shape extending over a predetermined area. The projecting outer side face 45 is in a position approximately corresponding to that of the pin 26 in the longitudinal direction of the belt and is near the pitch line P—P of the belt, and it's Y (radial) dimension l is slightly shorter than the dimension L of the concave slot 40.

Faces 46a, 46b extend transversely on the inner side of the block outer side portion 39. These faces 46a, 46b define the width W1 of the link chain 32, as shown in FIG. 4, and abut the outermost link plate 25 so as to smoothly guide the oscillation of the blocks 22, 23 with respect to the link plate 25.

As shown in FIG. 4, the pin set 26 (only one divided pin 26a is explained, but the other divided pin 26b is similar since they have mirror symmetry) has almost the same length as the distance between projecting outer side faces 45 of the block (right and left in the drawing). Both outer side ends 26c, 26c of the divided pin 26a have almost the same angle of inclination β as one of the sheave faces, similar to that of the projecting outer side faces 45, and both ends 26c of the pin contact the sheave sides along with both projecting end faces 45 of the block. The pin end 26c is located so as to approximately correspond to the projecting outer side faces 45 of the block in the longitudinal direction of the belt, and diameter m is approximately the same as the length 1 of the block projecting outer side face 45 or is slightly greater than the length 1.

As shown in FIG. 8(a) in detail, each divided pin 26a (26b) has rolling surface 31a which has a large radius of curvature, and a face 31b on the opposite side which is curved with a combination of the arcs to mate with the link plate sheet hole 30a. And, as shown in FIG. 8(b), the surface of end 26c extends in a straight line at a predetermined inclined angle, excluding the upper and the lower R (rounded) portions. As shown in FIG. 8(c) which is the C—C section of FIG. 8(b), the pin end surface 26c has a curved face R, e.g., shaped as an arc of a predetermined radius. The apical portion s of the curved face R is at a position shifted a predetermined distance toward the rolling surface 31a side and away from the center line CL (X axis). The pin end 26c is designed so as to contact the sheave side over the distance m in the radial direction "Y" at the apical position s on the curved face R, shifted toward the rolling surface side. The end face 26c of the pin 26 has a straight line contour, as seen from the Y direction (see FIG. 8(b)), since it is easy to machine. But, in a manner similar to a conventional pin, it may have an R (curved) shape, as seen from the Y direction. The length (X dimension) of the pin 26a (26b) along the pitch line P—P is set so as to be almost the same as that of the block 22 (23). In one pitch of the link chain 32 (that is, the length of one link plate), the end faces 26c, 26c of the two divided pins 26a, 26b and the projecting outer side faces 45, 45 of two blocks 22, 23, are spaced at almost equal intervals. These four faces, i.e., the end faces 26c, 26c and the projecting outer side faces 45, 45 can all contact the sheave side. The shape of the pin end face is preferably an arc face (R shape) having a predetermined center, but any rounded shape such as that of an ellipse or other curved surface, other than a true circular shape, is also suitable.

FIG. 9 is an illustrated comparison between the present invention (full line) and the prior art (see FIG. 1) (dashed line) for the link plate (A), the block (B) and the pin (C). A conventional link plate (5) is in the shape of a ring, and right and left pin holes communicate with each other, But, the link plate 25 of the present invention has the hole 30 which is comprised of portions 30a and 30b. The conventional blocks 2,3 separately support the link chain, within the three open holes 9, 10, 9. On the other hand, the blocks 22, 23 of the present invention collectively support one link chain 32 within one open hole 31 although the total number of link plates is the same as in the conventional link chain. Furthermore, the conventional block supports the pin 6 at the intermediate portions a, a, and has a space between it and the pin at both outer side portions b, b. Load from the blocks 2, 3 is transmitted to the pin by the pin slots 2b, 3b, and each pin end face Gc and both sides 2c, 3c of the blocks 2, 3 abut the sheave side in spite of slight dimensional error of the pin or the block, permitting the deformation of the pin and the block. On the other hand, the blocks 22, 23 of the present invention are abutted on and supported by the pin 26 in the concave slot 40 of both the right and left side portions 39, and the axial length Q of the abutting portion is longer than the length U of the prior art (Q>U). Thus, the contact area between the block and the pin and between the projection portions 41 of the blocks is larger, and power transmission by the contact pressure between the block and the pin and between the blocks is advantageous. Moreover, the block (and the pin) has a highly rigid structure with respect to the holding pressure from the sheave.

Figure 9A:
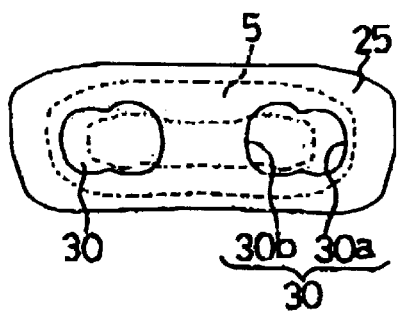
Figure 9B:
Figure 9C:
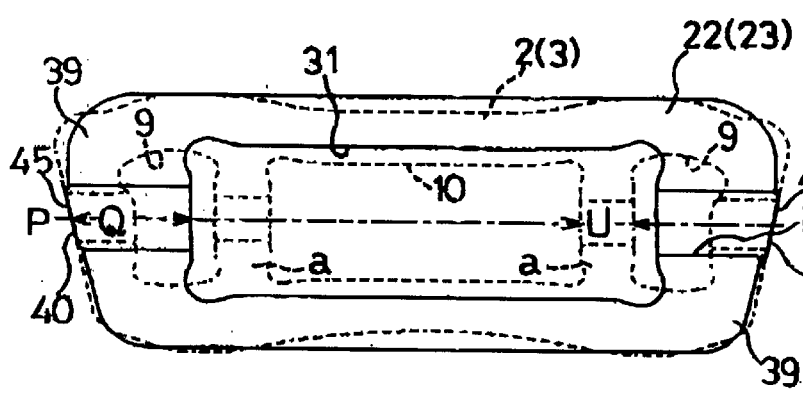

Further, in the prior art as shown in FIG. 9(b) surface c for pin interference prevention is provided in the concave slot, and the block escapes from the pin so as to oscillate. On the other hand, in the present invention, the concave slots 40 are almost symmetrical with respect to the pitch line, seen from the side (see FIG. 9(b)), and the pin and the block abut each other with the pitch line at the center of the abutment. Then, the block escapes from the pin so as to oscillate the upper and the lower hands. Still further, the end face 6c of the conventional pin 6, has the R form r, as seen from the side, that is, on the face parallel to the paper of FIG. 9(c). On the other hand, the R form R, seen from the plane, on the face parallel to the face perpendicular to the paper of FIG. 9(c), (see FIG. 8(c)), is formed on the pin 26 of the present invention. Moreover, the dimension L1 (see FIG. 8(c)) in the longitudinal direction of the belt (Z) on the pitch line, is almost the same as the length L2 (see FIG. 7(a)) of the projecting side faces 45 of the blocks 22, 23.

Furthermore, the shape of the outer end face 26c of the divided pins 26a, 26b (pin set 26 hereinafter) will now be explained with reference to FIG. 11 through FIG. 33. The axial length (Z dimension) (see FIG. 4) of the pin set 26 contacting the opposing sides of the sheave when the endless belt 21 bites into the pulley is determined by the minimum clearance between the end face of the pin and the sheave. When the pin is rotated, the clearance between the end face of the pin and the sheave is changed so as to change the effective pin length. That is, the belt 21 being in a straight line state at the time of biting into the pulley is curved (bent) around the effective diameter of the pulley. As this occurs, the pin 26 is rotated, and the abutting position of the end face of the pin is determined on the basis of the clearance between the end face of the pin and the sheave.

Figure 11:
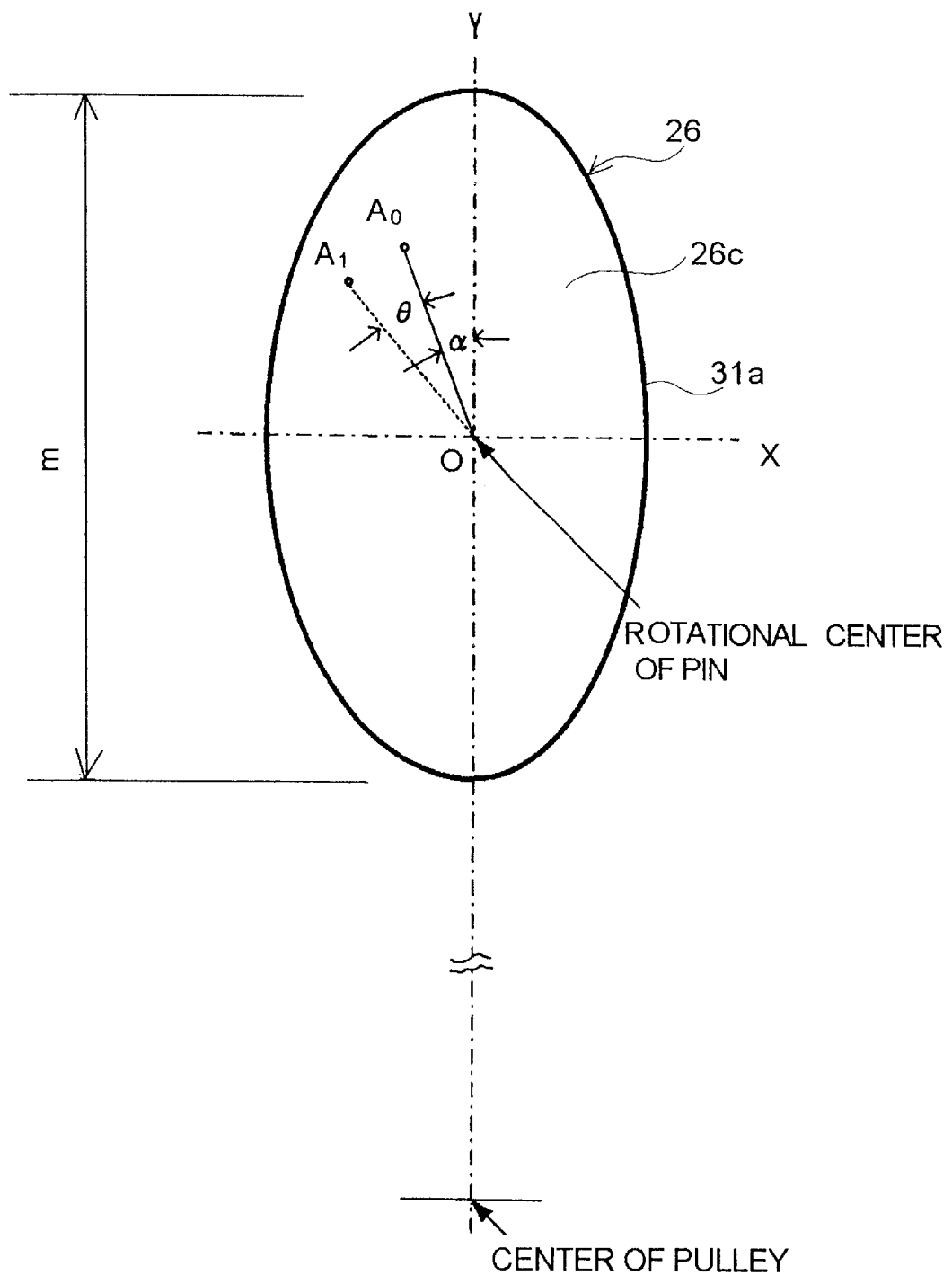
FIG. 11 is a side view of the end face of a pin for analyzing change of clearance between the pin and the sheave by rotation of the pin.

As shown in FIG. 11, the center 0 of the divided pins 26a, 26b rotating on the rolling surfaces 31a in contact with each other is on the intersection between the center line of the pulley (Y axis) and a line along the longitudinal direction of the belt through the center of m (FIG. 8(b)) (X axis). When the pin set is rotated θ degree about the rotational center 0, the value of the clearance δ (both sides) with the sheave at an optional point A is calculated as follows.

$$\delta = 2\{\sqrt{\{x_1^2 + (R_0+y_1)^2\}} - (R_0+y_0)\} \times \tan \beta + c = 2\{\sqrt{\{x_0^2 + y_0^2\}\sin^2\{\pm^{*3}\theta\pm^{*1}\tan^{-1}(x_0/y_0)\} + \{R_0 \pm^{*2}\sqrt{(x_0^2+y_0^2)}\cos\{\pm^{*3}\theta\pm^{*1}\tan^{-1}(x_0/y_0)\}\}^2\} - (R_0+y_0)\}\times\tan \beta + c \quad (1)$$

$$x_1 = r \sin(\theta+\alpha) \quad (2)$$

$$y_1 = r \cos(\theta+\alpha) \quad (3)$$

$$\tan \alpha = x_0/y_0 \quad (4)$$

$$r = \sqrt{(x_0^2+y_0^2)} \quad (5)$$

Wherein:

δ: clearance with sheave mm $R_0$: radial position of rotational center of pin mm $A_0$: ($x_0$, $y_0$): x, y coordinates of point $A_0$ mm $A_1$: ($x_1$, $y_1$): x, y, coordinates of point $A_1$ mm θ: rotational angle of pin [°] (left rotation positive)

α: angle of point $A_0$ [°]

r: distance from rotational center of pin to point $A_0$ mm

β: sheave one side angle [°]

c: amendment value of pin end face shape mm $\pm^{*1}$:
  (+) when $x_0$ is positive,
  (−) when $x_0$ is negative $\pm^{*2}$:
  (+) when $y_0$ is positive,
  (−) when $y_0$ is negative $\pm^{*3}$:
  (+) when $x_0$ is negative,
  (−) when $x_0$ is positive When c=0 the end face of the pin 26c is a flat face. When the shape of the end face of the pin is an arc, the value of c is determined as follows.

Figure 12:
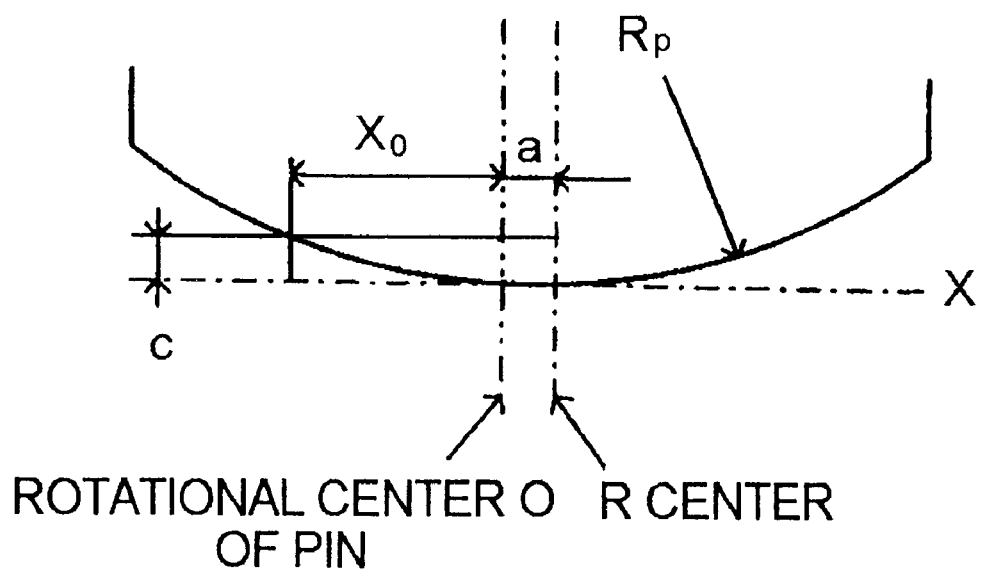
FIG. 12 is a sectional view of the end face of the pin showing the X dimension (circumference) enlarged in scale.

When the pin end face 26c is the R shape on the X axis, the value c of the shape of the pin end face is as follows, with reference to FIG. 12:

$$c = 2\{Rp - \sqrt{\{Rp^2-(-x_0+a)^2\}}\} \quad (6)$$

Wherein,

Pp: pin end face R mm a: distance between the R center and the rotational center of the pin mm For instance, when Rp=10, a=0.011

$$c = 2\{10 - \sqrt{\{100-(-x_0+0.011)^2\}}\}$$

Figure 13:
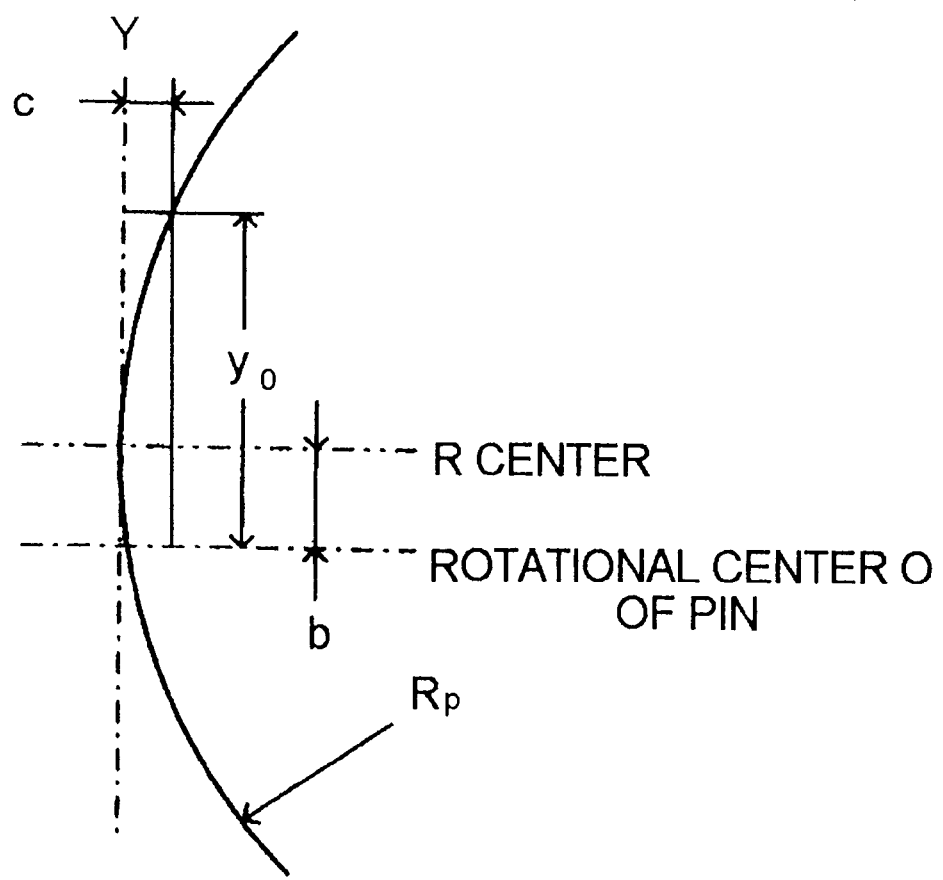
FIG. 13 is a sectional view of the end face of the pin showing its "Y" dimension (radial dimension), enlarged its scale.

On the other hand, when the shape of the pin end face is the R shape on the Y axis, the value c of the shape of the pin end face is as follows, with reference to FIG. 13.

$$c = 2\{Rp - \sqrt{\{Rp2-(y_0-b)^2\}}\} \quad (7)$$

Wherein, b: distance between the R center and the rotational center 0 of pin mm For instance, when Rp=10, b=0, $$c=2\{10-\sqrt{(100-y_0^2)}\}$$

Furthermore, when the R shape of the pin end face is inclined on both X and Y axes, the value c of the shape of the pin end face is as follows, with reference to FIG. 14:

$$c=2\{Rp-\sqrt{\{Rp^2-(-x_0+a)^2\}}-y_0(\tan \Phi-\tan \beta)+x_0 \tan \kappa\} \quad (8)$$

Wherein,

Φ: angle of inclination on Y axis [°]

κ: angle of inclination on X axis [°]

For instance, when Rp=10, a=0.011, c=2 {10−√{100−(−$x_0$+0.011)$^2$}−$y_0$(tan Φ−tan 11°)+$x_o$ tan κ}

Next, the clearance δ for X and Y coordinates will be explained in detail with reference to FIG. 15 through FIG. 26, with the pin rotational angle θ as a parameter, on the basis of the above-mentioned equations.

Figure 15:
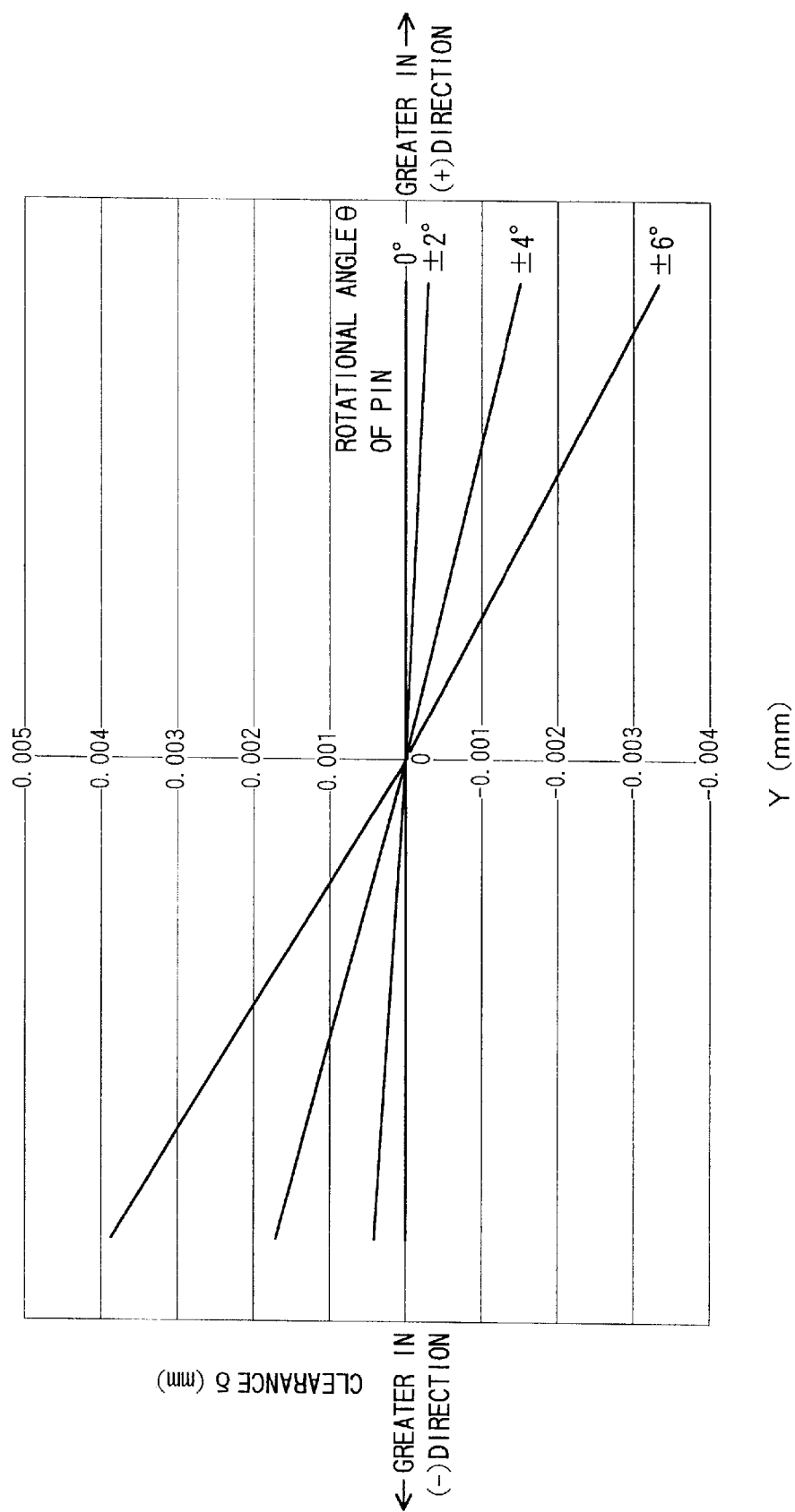
FIG. 15 is a graph of the Y dimension of clearance between the pin and the sheave for various pin rotational angles when the shape of the end face of the pin is flat and the effective diameter of the pulley is the minimum diameter.
Figure 16:
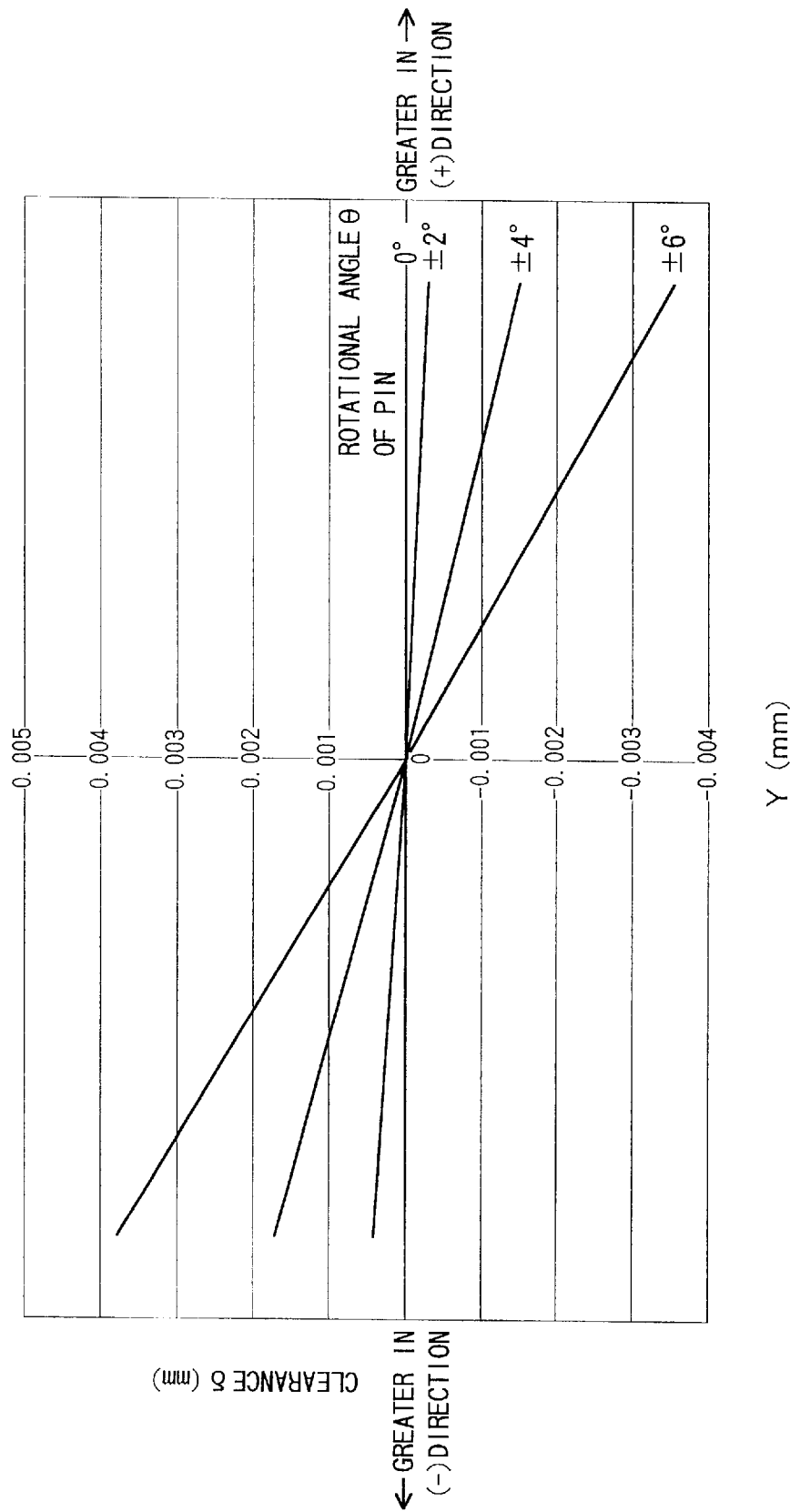
FIG. 16 is a graph like FIG. 15 when the shape of the end face of the pin is flat and the effective diameter of the pulley is the maximum diameter.

FIG. 15 through FIG. 18 show the relationship between the pin with a flat end face (c=o) and the clearance δ (both sides). FIGS. 15 and 16 show $x_0$=0, that is, the clearance δ for each point on the line Y for the center of the pulley. FIG. 15 shows the case where the effective diameter of the pulley (the radial position $R_0$ of the pin rotational center 0) is small, and is the minimum diameter design and FIG. 16 shows the maximum effective diameter design.

Figure 17:
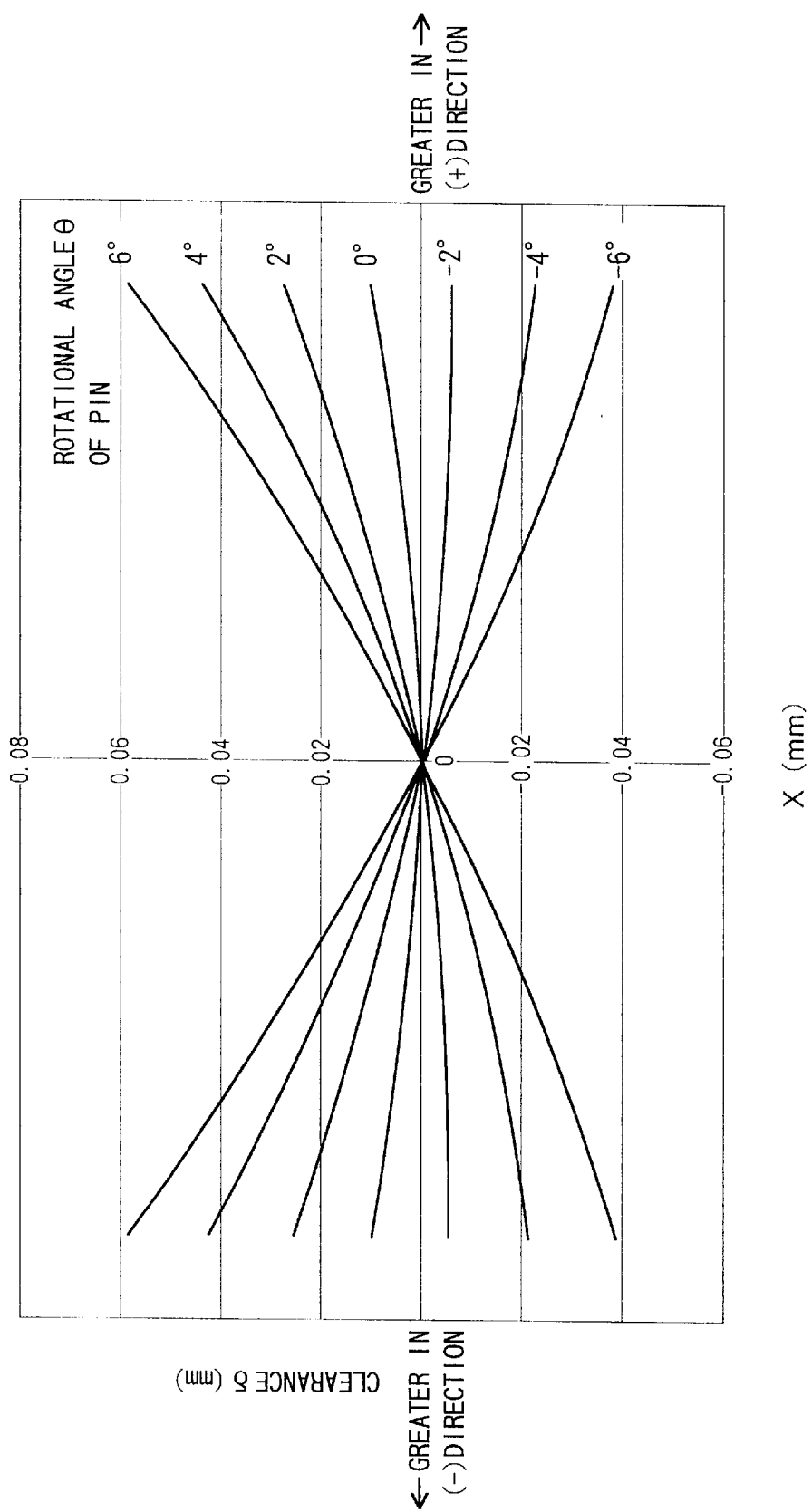
FIG. 17 is a graph of clearance between the pin and the sheave in the X dimension for various pin rotational angles when the shape of the end face of the pin is flat and the effective diameter of the pulley is the minimum diameter.
Figure 18:
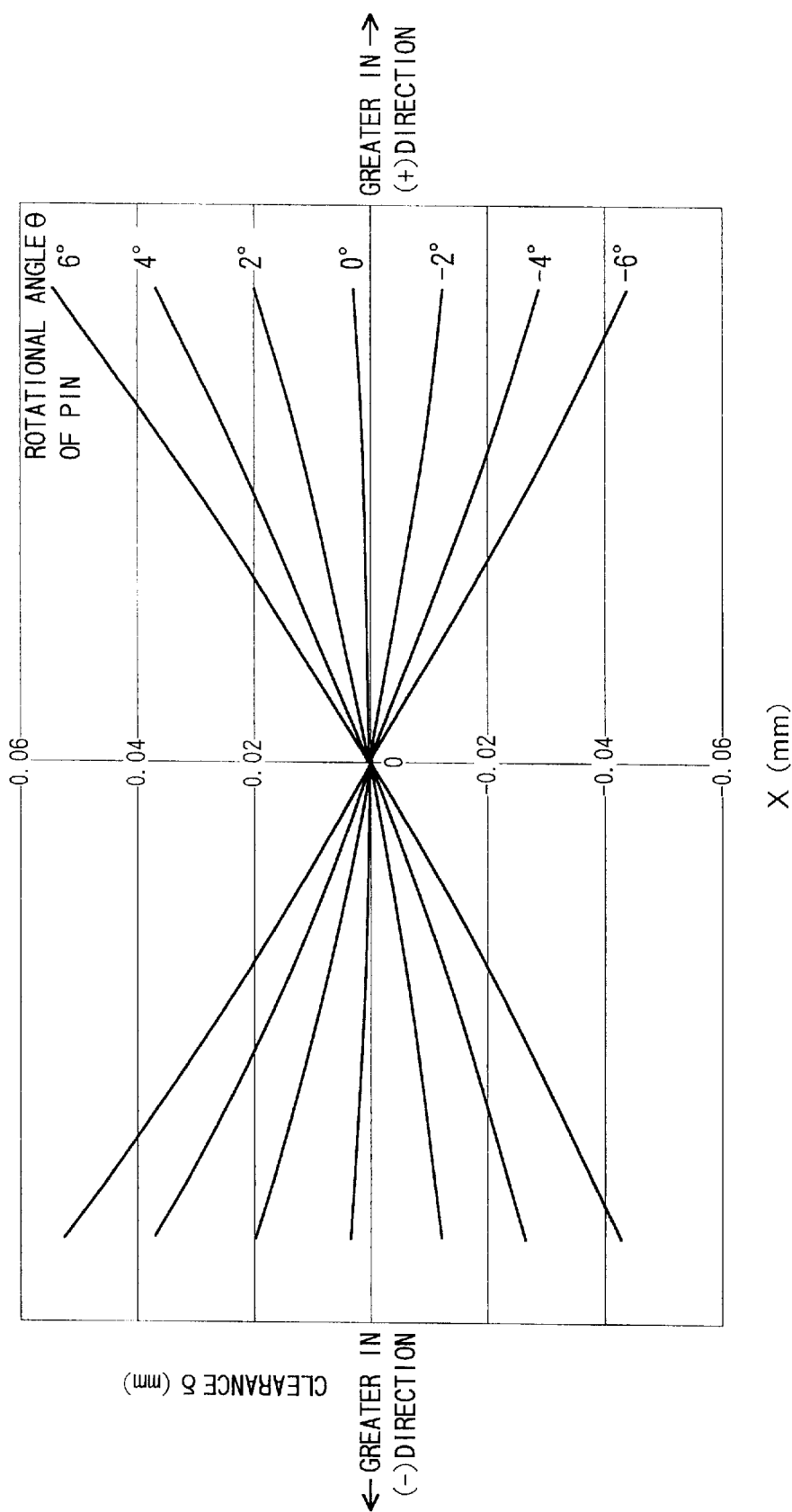
FIG. 18 is a graph like FIG. 17 when the shape of the end face of the pin is flat and the effective diameter of the pulley is the maximum diameter.

FIG. 17 and FIG. 18 show $y_o$=0, that is, the clearance δ at each X coordinate along the X axis of the pin, wherein FIG. 17 shows the minimum effective diameter design, and FIG. 16 shows the maximum effective diameter design.

In FIG. 15 through FIG. 19, the clearance δ on the X coordinates is 0.02–0.06 mm although the clearance δ on the Y coordinates is 0.001–0.005 mm. As known from this, the clearance δ at each point on the X axis, as shown in FIG. 17 and FIG. 18, is more than the clearance δ at each point on the Y axis as shown in FIG. 15 and FIG. 16, regardless of whether the effective diameter of the pulley is big or small.

That is, the sensitivity of the X coordinate with respect to the change of the effective pin length B (the clearance δ of the pin with the sheave), is more than ten times that of the Y coordinates. The change of the effective pin length on the Y coordinates is small, several microns, and has negligible influence, which is different from the change with X coordinates.

Thus, even if the R shape of the end face 26c of the pin 26 is on the X axis only, that is, even if the end face 26c is a cylindrical shape formed with the same radius at each point on the Y axis, i.e., an arc shape only along the X axis, the substantial change of the pin length with the pin rotation in practical use is not influenced.

When the end face of the pin is made cylindrical and it is precisely formed with a grinding machine, machining in only one direction (two-dimensional machining) is sufficient. So, the machining is made easy in comparison with the forming of a spherical shape for which three-dimensional machining is necessary, and a highly accurate pin end face shape can be obtained. Furthermore, Hertz stress is about half that with the spherical shape, and this cylindrical shape is excellent in its strength and durability.

In order to give the belt-type continuously variable transmission a predetermined torque capacity, it is necessary hold the belt on a pulley with a predetermined pressing force. For this reason, a large pressing force is imparted to the pin end face from the sheave side. But, because the Hertz stress corresponding to the pressing force is smaller in comparison with the spherical shape, the pin with a cylindrical end face is stronger.

If the pin end face is made spherical, the change of the pin length along the Y axis is smaller than the change on the X axis and a highly accurate machining of a sphere is troublesome, and the Hertz reaction is higher. But, a pin end face having less change of the pin length with the pin rotation can be obtained, and the shape of the pin end face may be spherical by overcoming the above-mentioned defects.

The case wherein the pin end face is a cylindrical shape of a predetermined radius (for example, 10 mm), i.e., an arc formed along the X axis, is shown in FIGS. 19–26. The change of the clearance δ at each point on the X axis is shown with the rotational angle of the pin θ as a parameter.

Figure 19:
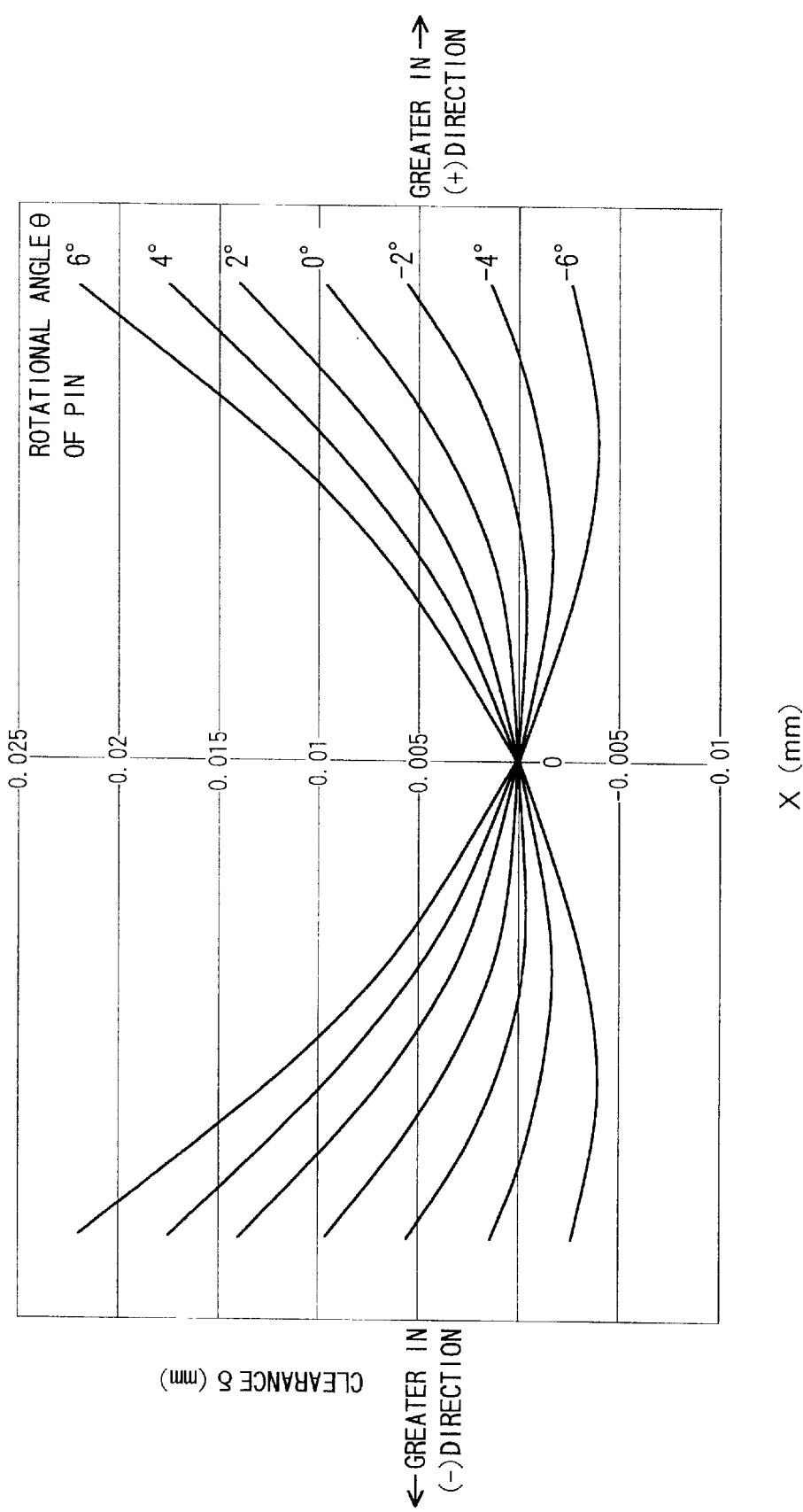
FIG. 19 is a graph of clearance between the pin and the sheave in the X dimension for various pin rotational angles when the shape of the end face of the pin is R shape, center of the R shape and rotational center of pin are centered on X axis, and the effective diameter of the pulley is the minimum at $y_0=0$.
Figure 20:
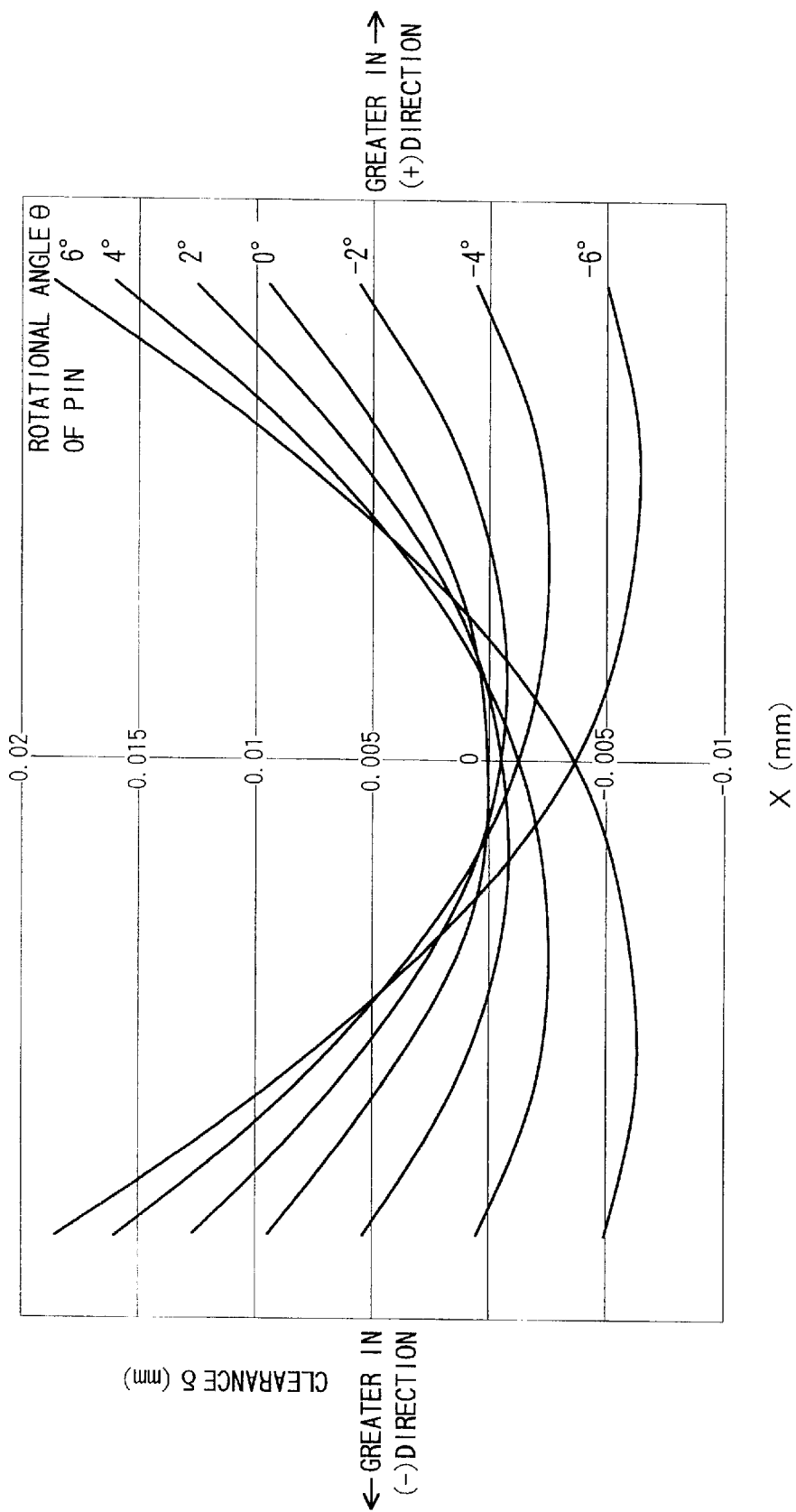
FIG. 20 is a graph similar to FIG. 19 with values on the X-axis, shifted 1.5 mm on the upper hand in the Y direction.
Figure 21:
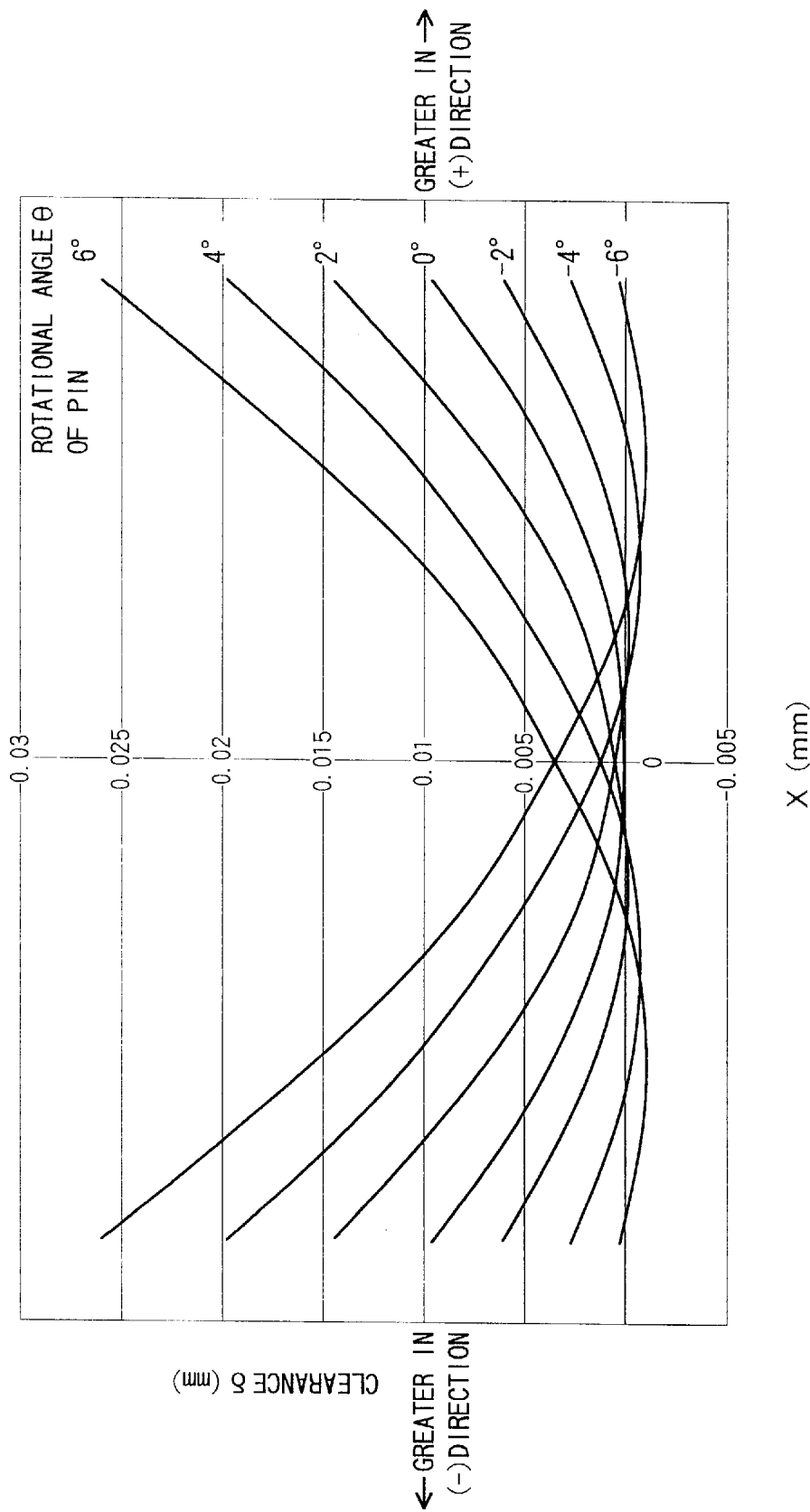
FIG. 21 is a graph similar to FIG. 19 with values on X-axis, shifted 1.5 mm on the lower hand in the Y direction.

FIG. 19 through FIG. 23 show the case where the effective diameter $R_0$ of the pulley is the minimum diameter. FIG. 19 shows the case where the distance a of R center from the rotational center O of the pin on the X axis is 0 (a=0), that is, the center of the R radius of the pin end face is positioned on the normal plane passing through the rotational center 0 of the pin, $y_0$=0. FIG. 20 shows the case wherein a is 0 (a=0) and $y_0$=1.5, that is, 1.5 mm from the center line (X axis) in FIG. 11. FIG. 21 shows the case where a is 0 (a=0), and $y_0$=−1.5, that is, 1.5 mm from the center line (X axis) in FIG. 11.

Figure 22:
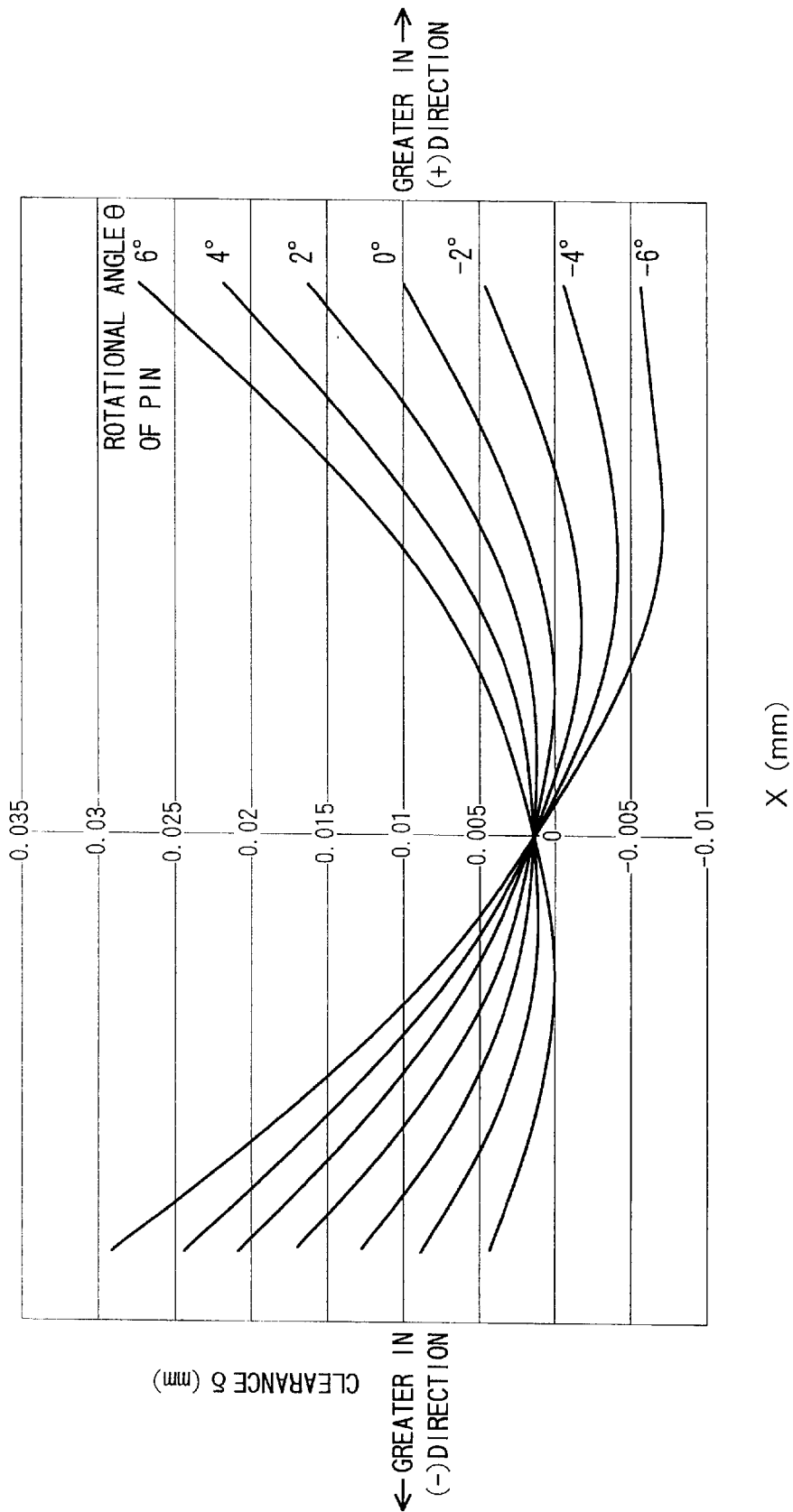
FIG. 22 is a graph wherein the center of the R shape of the end face of the pin is shifted a predetermined distance to the right (in the positive direction) on the X axis relative to the rotational center of the pin and wherein the pulley effective diameter is the minimum diameter.
Figure 23:
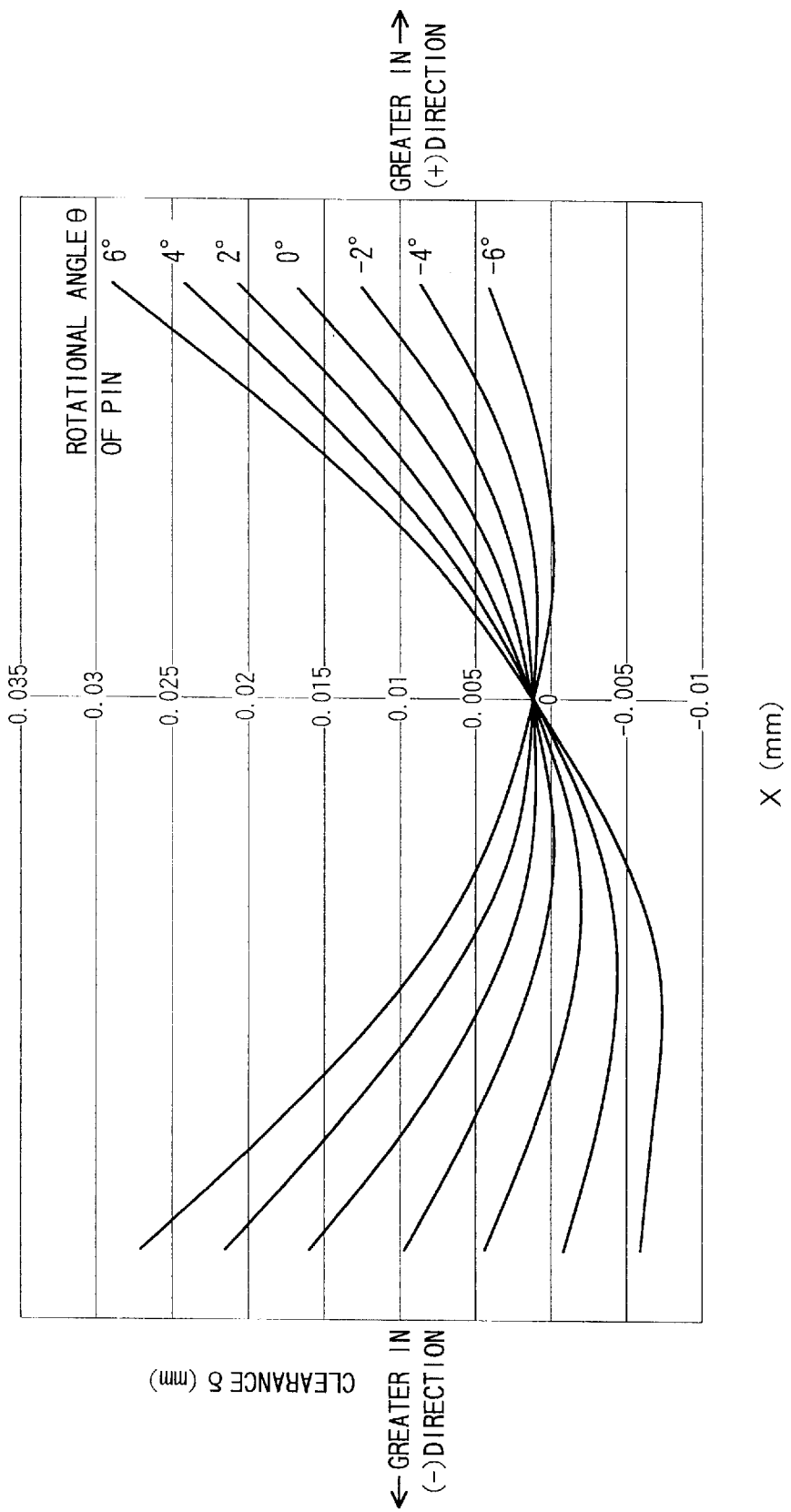
FIG. 23 is a graph like FIG. 22 wherein the center of the R shape of the end face of the pin is shifted a predetermined distance to the left (in the negative direction) on the X axis relative to the rotational center of the pin and the effective diameter of the pulley is the minimum diameter.

FIG. 22 shows the case wherein $y_0$=0 (on the center line; on X axis) when the center of the curved face R radius of the pin end face on the X axis is shifted 0.1 mm to the right (in the positive direction) (a=0.1). FIG. 23 shows the case wherein $y_0$=0 (on the center line) when a=−0.1, that is, the center of R radius of the pin end face is shifted 0.1 mm on the X axis with respect to the rotational center of the pin, to the left (in the negative direction).

Figure 24:
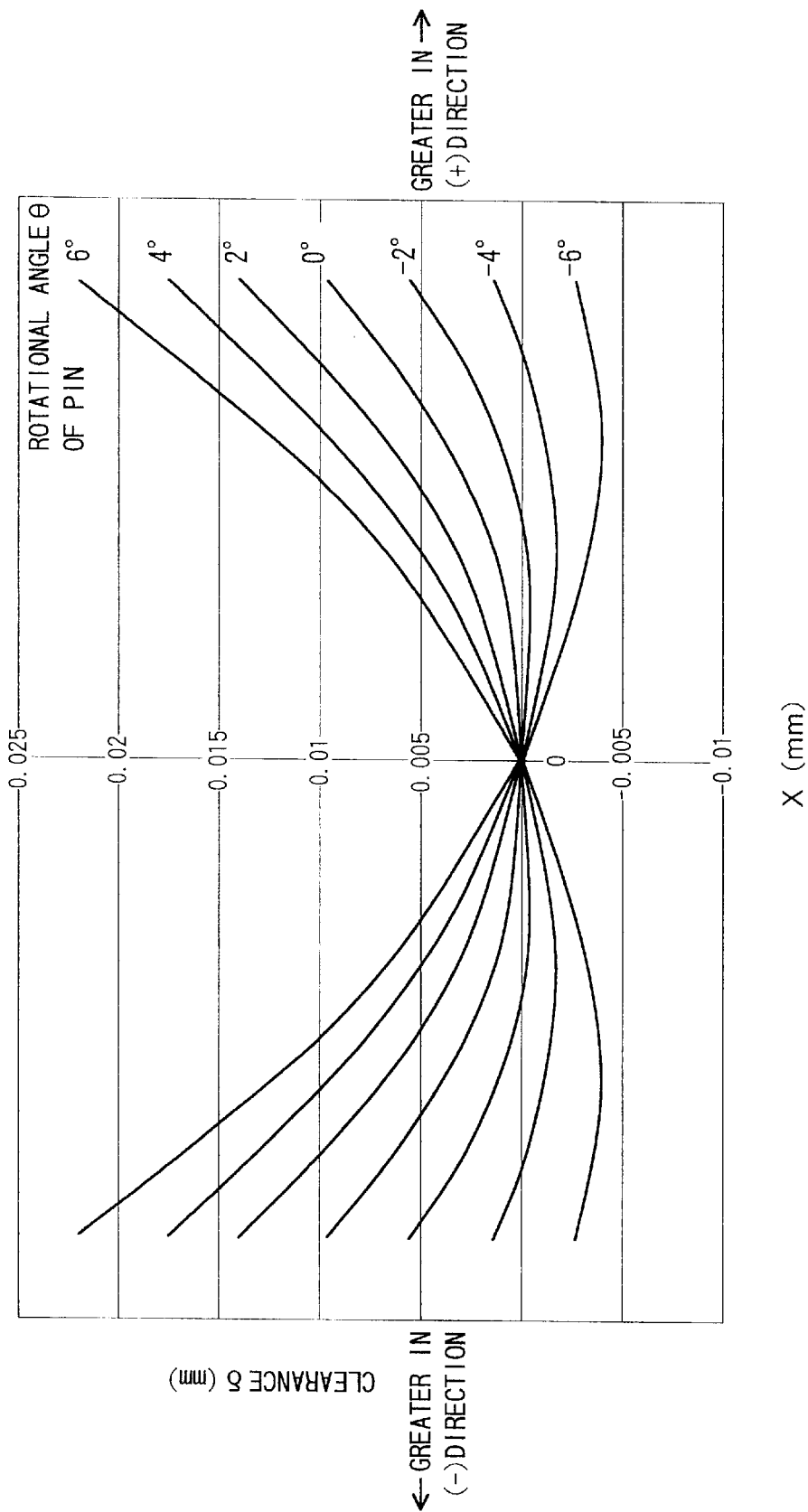
FIG. 24 is a view similar to FIG. 19 when the effective diameter of the pulley is the maximum diameter.
Figure 25:
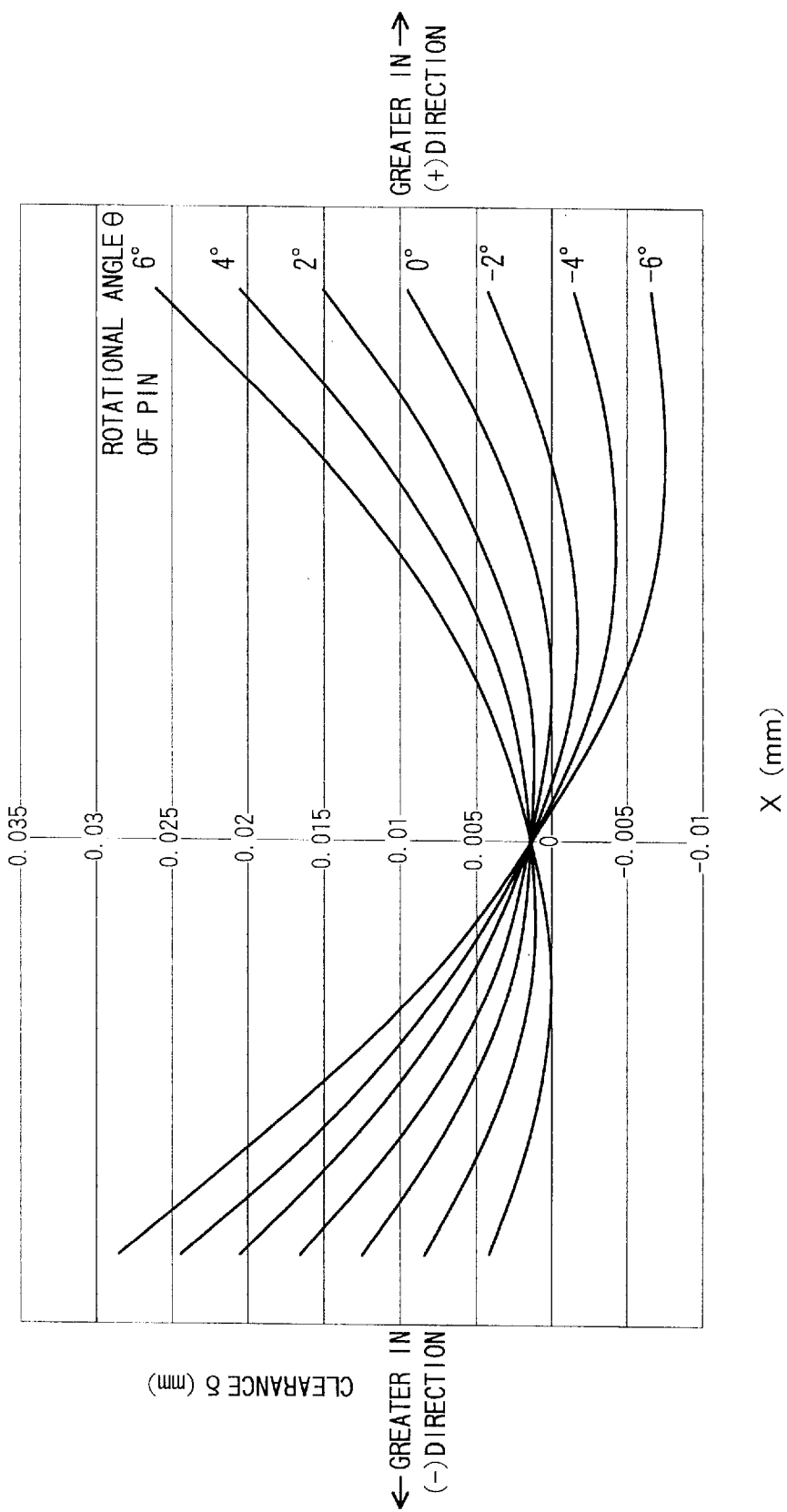
FIG. 25 is a view similar to FIG. 22 when the effective diameter of the pulley is the maximum diameter.
Figure 26:
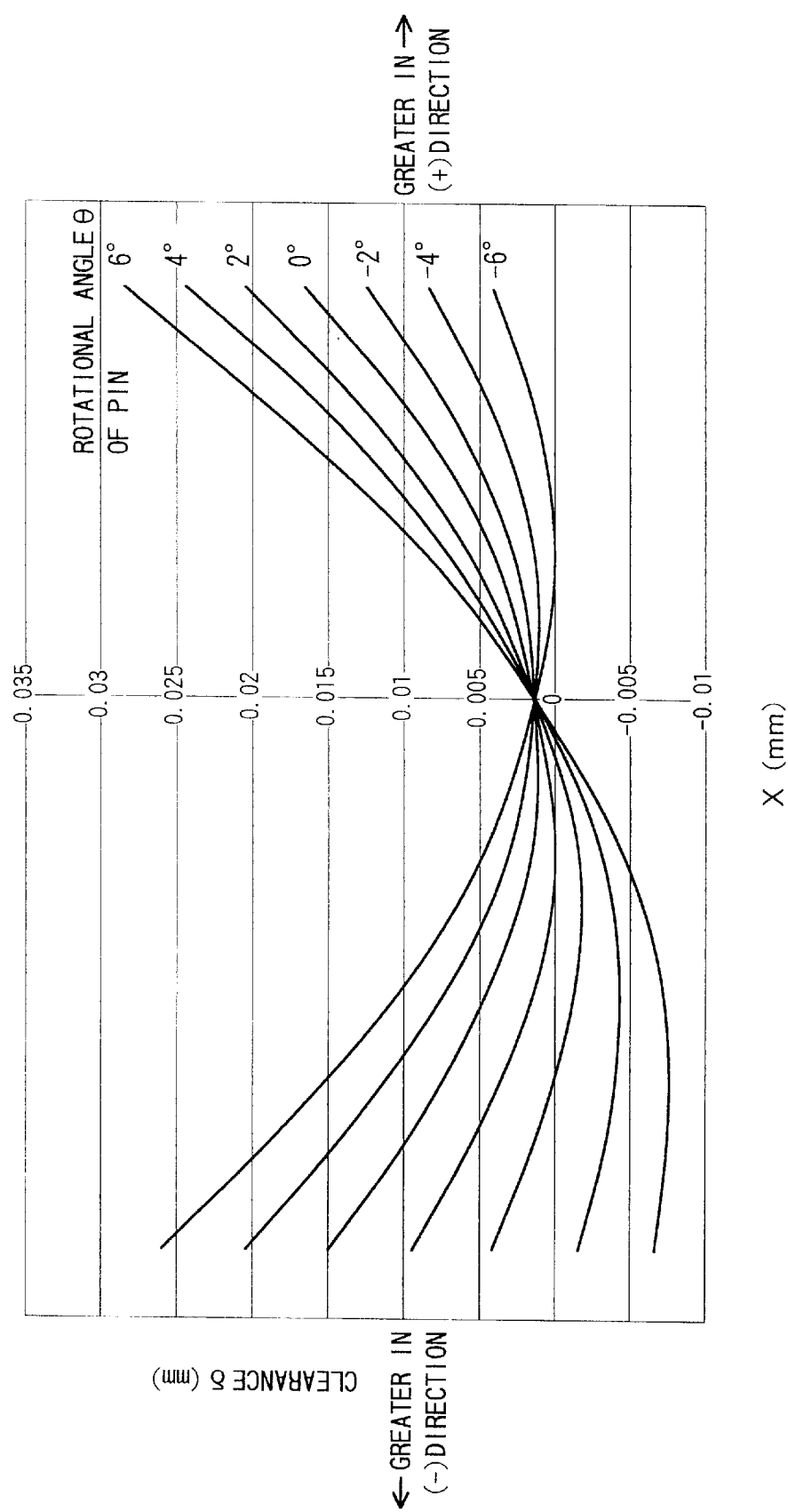
FIG. 26 is a view similar to FIG. 23 when the effective diameter of the pulley is the maximum diameter.

FIG. 24 through FIG. 26 show the case where the effective diameter $R_0$ of the pulley is the maximum diameter. FIG. 24 shows the case where a is 0 (a=0), and $y_0$=0 (center line; on X axis) FIG. 25 shows the case where a is 0.1, $y_0$=0 when the center of the R shape of the pin end face is shifted 0.1 mm to the right (in the positive direction) with respect to the rotational center of the pin on the X axis. FIG. 26 shows the case where a is −0.1 and $y_0$=0 when the center of the R shape of the pin end face is shifted 0.1 mm to the left (in the negative direction) with respect to the rotational center of the pin, i.e., shifted on the X axis.

As is clear from the comparison between FIGS. 19, 20, 21, 24 and FIGS. 17, 18, for each rotational angle θ of the pin, the bigger the X coordinate is in (+) direction and in (−) direction, the bigger the clearance δ, i.e., direct proportionality when the pin end face 26c is a flat face. But, when the pin end face is made a R shape, the clearance δ is small, on the order of several microns, and the change of the clearance δ on each X coordinate has the minimum value. This is the same inclination even at the center of the Y axis ($y_0$=0; on the X axis) (see FIG. 19), and even at a position shifted from the center on the X axis (see FIG. 20 and FIG. 21). And, this is the same inclination regardless of whether the effective diameter of the pulley is small (see FIG. 19) or large (see FIG. 24).

The pin X dimension (length) is increased about +3 micron at $y_0$=1.5 mm as shown in FIG. 20 and is decreased about 3 micron at $Y_0$=−1.5 mm as shown in FIG. 19. This is decreased by the deflection of the pin in the Y direction.

Therefore, the arc (R) shape on at least the X axis is preferable to the planar shape (the prior art having R shape along the Y axis is almost similar) since the variation of the clearance δ (effective pin length) with change in the rotational angle of the pin is small.

The influence of the center of the R shape on the pin end face will now be explained with reference to FIG. 22 through FIG. 26. When the center of the R shape is moved away from the rotational center 0 of the pin along the X axis, the minimum value and the X coordinate of the clearance between the pin end face and the sheave are changed. If the effective diameter of the pulley around which the belt is wound is changed, this is the same inclination (see FIG. 22 and FIG. 25).

Figure 27:
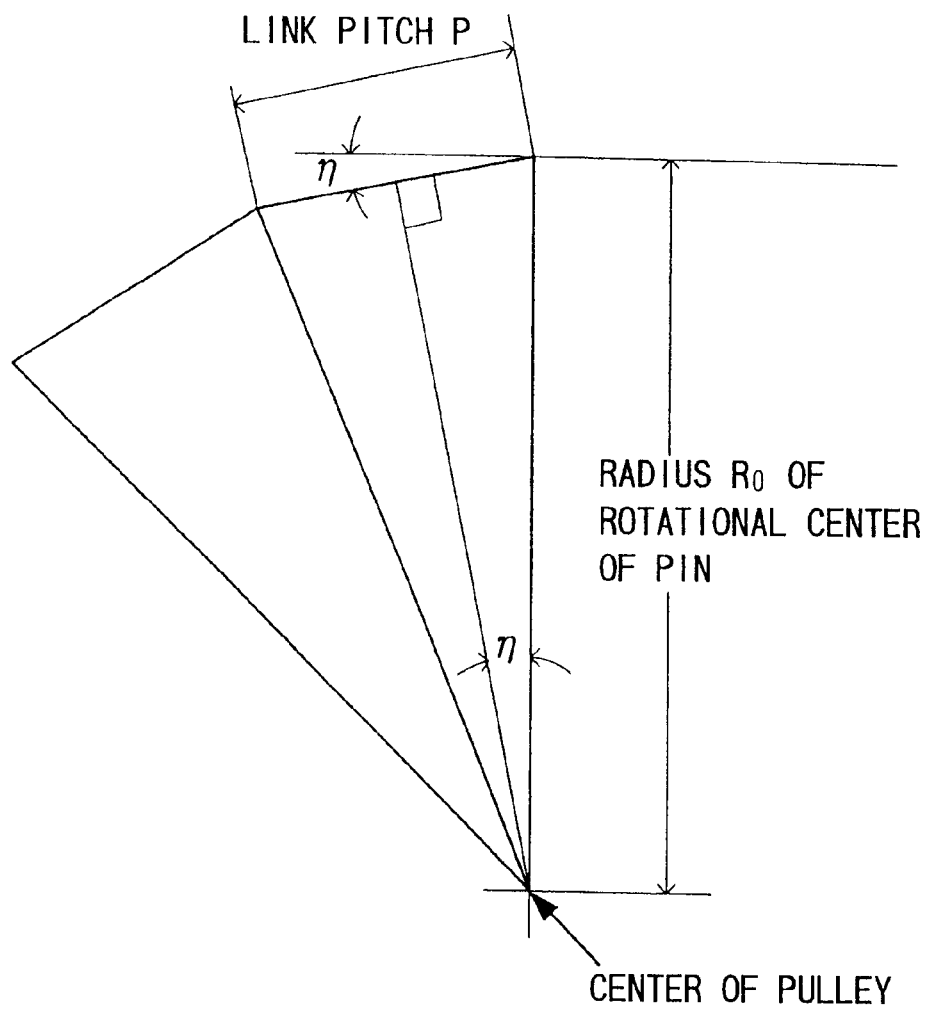
FIG. 27 is an illustration of change in the radial position of the rotational center of the pin as the endless belt of the present invention bites into pulley.

Variation of the rotational angle of the pin will now be explained with reference to FIG. 27 and FIG. 28. Since each link 25 pivots as the belt bites into the pulley, because the pin 26 is held united with the link, the pin rotates through an angle η which is the same as the angle η through which the link pivots.

If the radius of the rotational center of the pin (≈ pitch circle=the effective diameter of the pulley) from the center of the pulley is $R_o$, the link pitch is P, and the angle η is as follows.

$$\eta = \sin^{-1}\{P/(2P_0)\}$$

Wherein:

η: variation of rotational angle of pin

P: link pitch (mm)

$R_0$: radius of rotational center of pin (mm)

Figure 28:
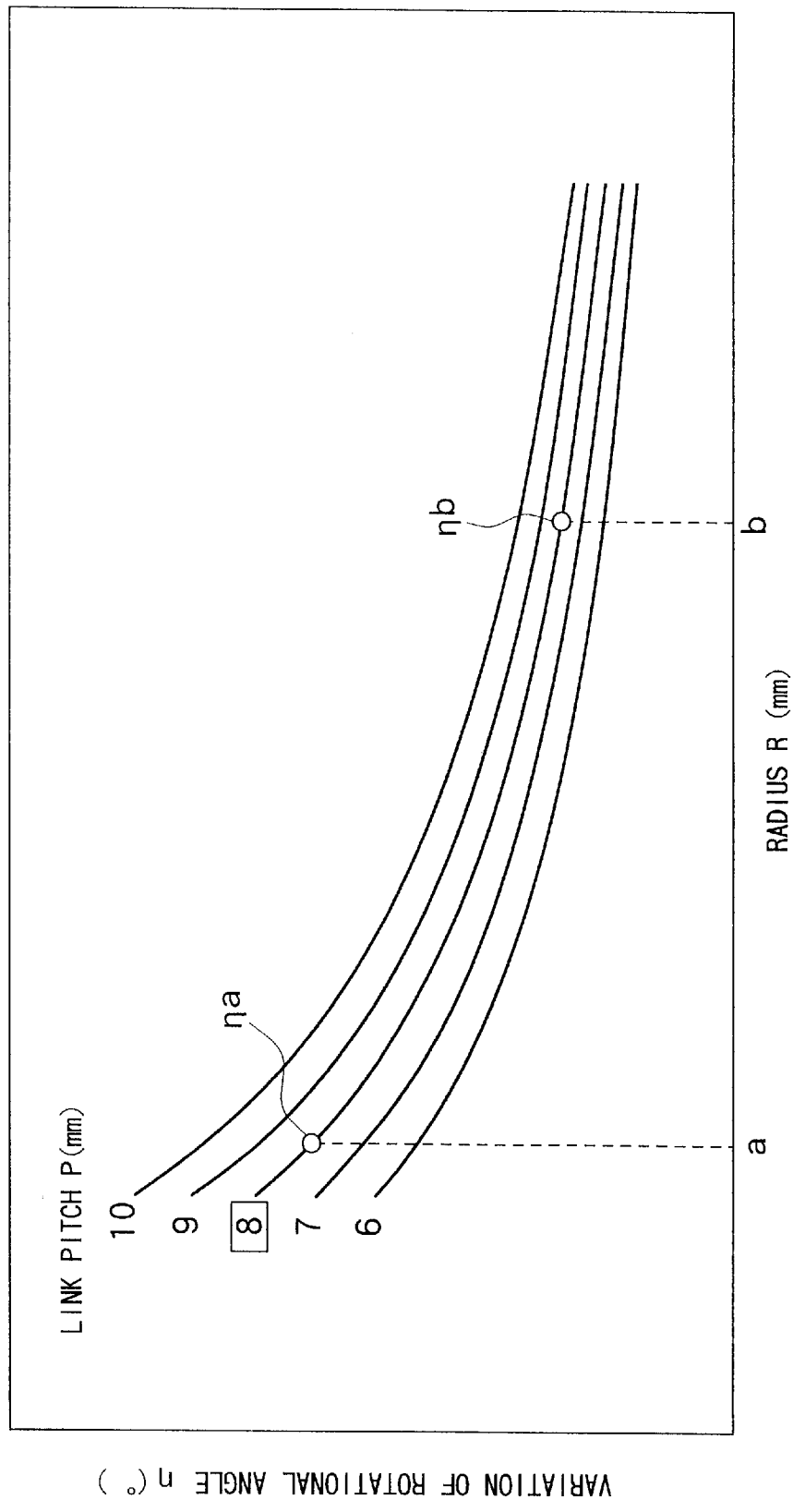
FIG. 28 is a graph of the relationship between the effective diameter of the pulley and variation of rotational angle for various link pitches.

FIG. 28 is a graph showing the rotational angle η versus the effective diameter of the pulley (radius $R_0$) with the link pitch P as a parameter. For instance, in case of a link pitch of 8 mm, the value of the rotational angle η corresponding to the minimum value a of the effective diameter of the pulley (radius $R_0$) is ηa, and the value of the change η in the rotational angle corresponding to the maximum value b of the effective diameter of the pulley is ηb.

The optimum ratio of the center position of X coordinates defining the R shape of the pin end face will now be explained with reference to FIG. 29 through FIG. 31.

Figure 29:
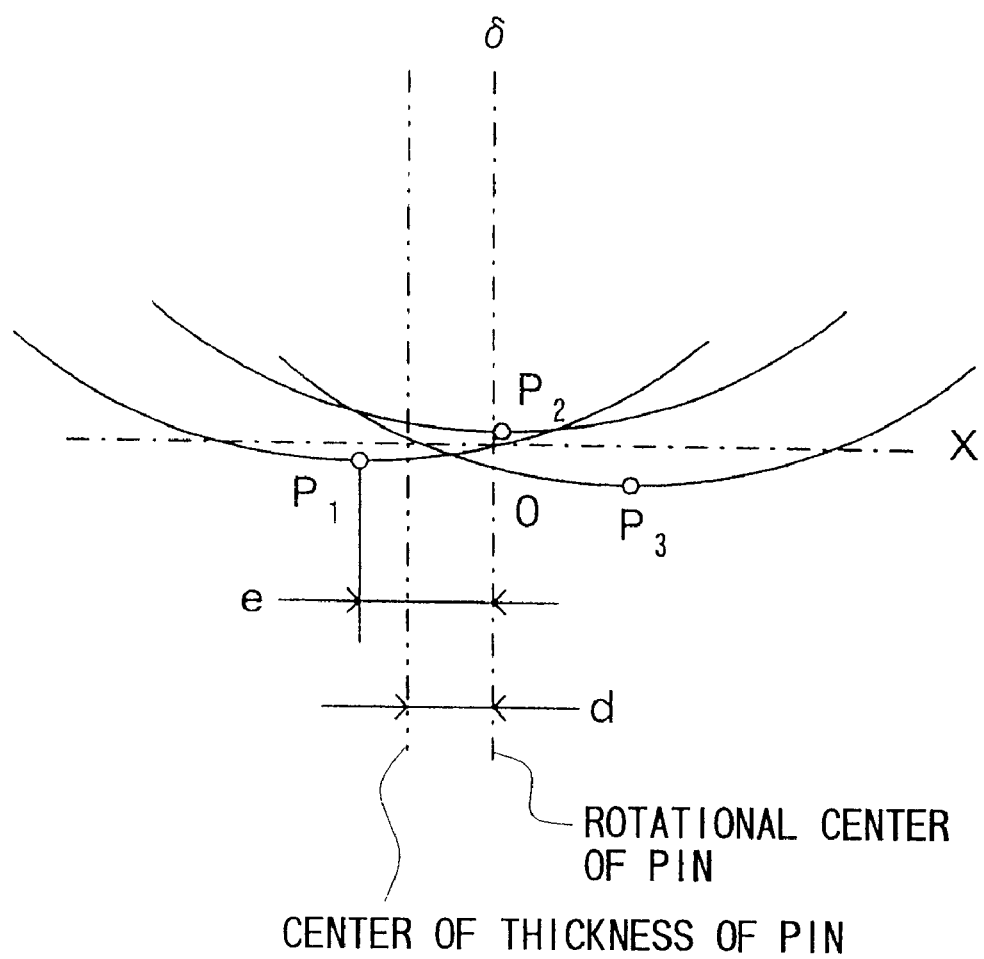
FIG. 29 is an illustration of change of clearance with the sheave due to rotation of the pin with the rotational angle of the pin as a parameter, for explaining variation of the pin effective length.

FIG. 29 is a view showing the change in the clearance δ between the pin end face and the sheave along the X axis with the rotational angle θ of the pin as a parameter, with the center of the R shape of the pin end face shifted a distance a in the X direction from the rotational center O of the pin. In FIG. 29, the point where the clearance δ is minimum is the contact point P ($P_1$, $P_2$, $P_3$) between the pin end face and the sheave, and the change of the contact point P corresponds to the change μ in the effective axial length B of the pin 26 due to rotation of the pin, and the change μ can be based on the above-mentioned values δ and X.

Reduction of noise when the divided pin bites into the sheave is achieved by:

1) decreasing the difference between the values of e and d at the positional angle where the pin bites into the sheave;
2) decreasing the variation ε of the clearance δ; and
3) decreasing the change in the pin length increase with respect to the change of θ as much as possible, Wherein:

e: value X at positional angle where pin bites into sheave (mm)

d: discrepancy between the geometric center (center of arc—R shape) of the pin end face and the rotational center of pin (mm)

ε: variation of pin effective length with pin rotation μ

Figure 30:
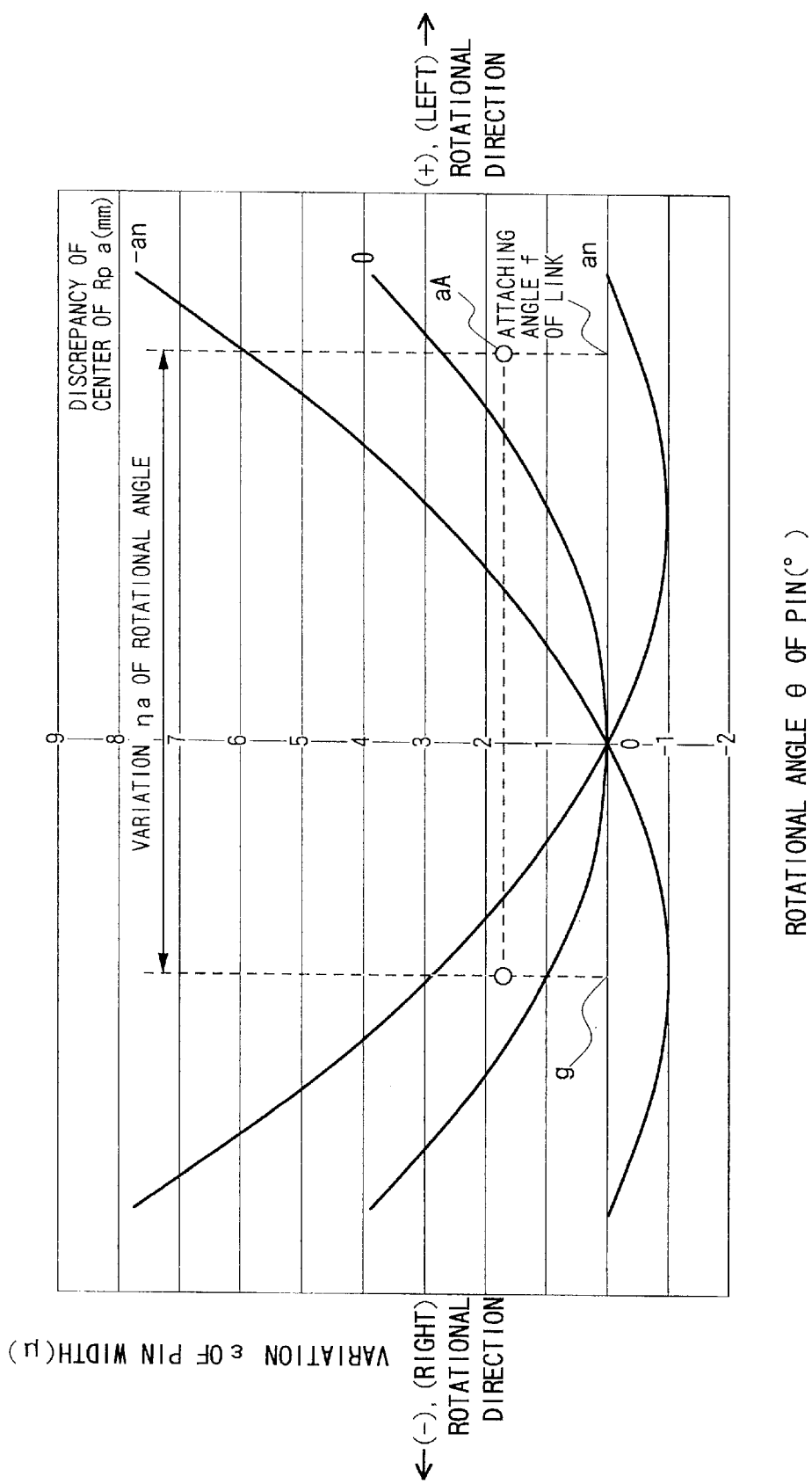
FIG. 30 is a view showing variation of the pin effective length with change in the pin rotational angle as a discrepancy a of the center of the R shape of the end face of the pin when the effective diameter of pulley is the minimum diameter.
Figure 31:
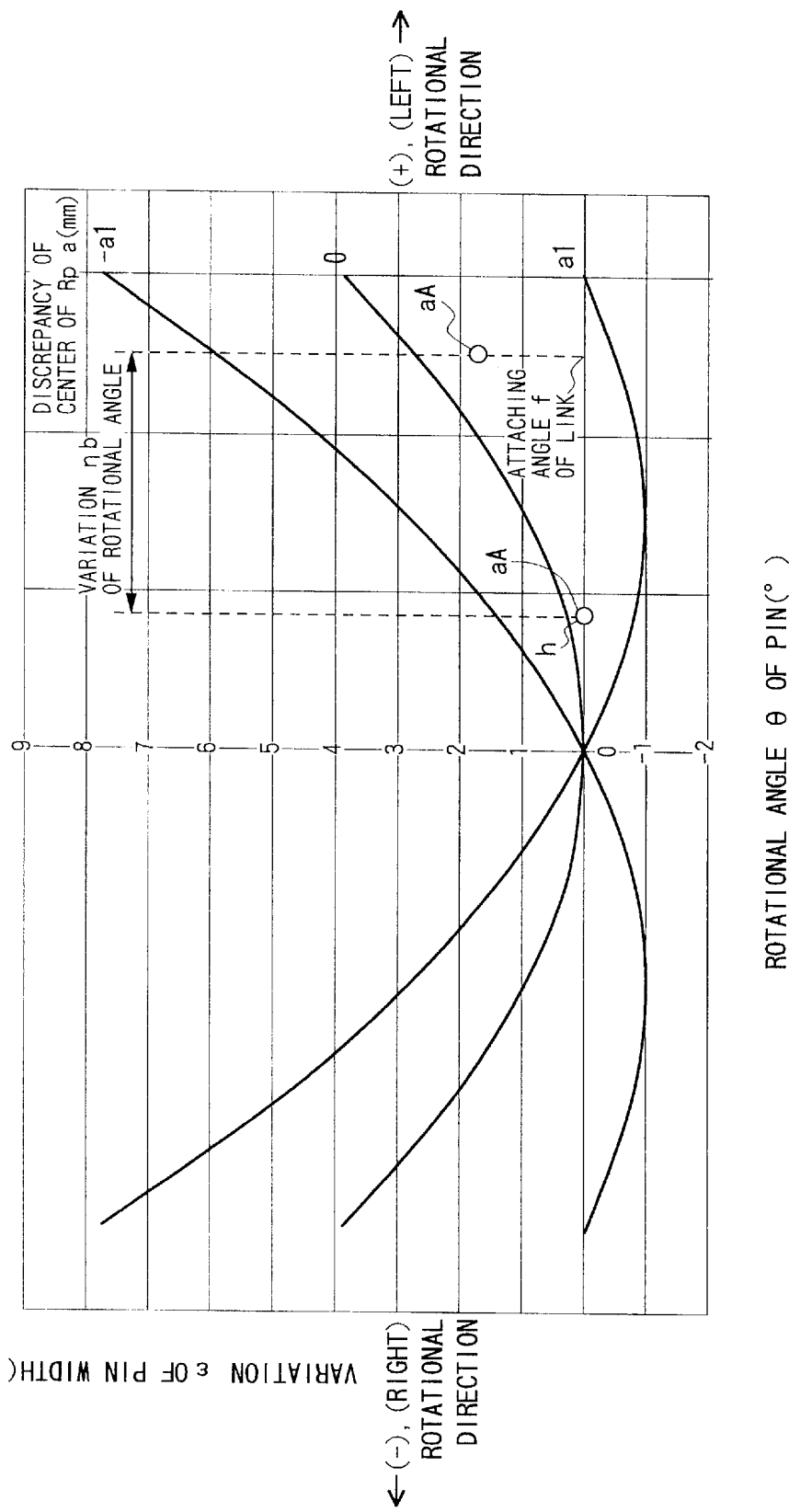
FIG. 31 is a view similar to FIG. 30 when the effective diameter of the pulley is the maximum diameter.

FIG. 30 and FIG. 31 show the variation ε of the pin length with change in the rotational angle θ of the pin with the distance a between the center of R shape Rp of the pin end face and the rotational center of the pin as a parameter. In the figure, the link (plate) attaching angle f is the angle between the Y axis of the respective divided pins 26a, 26b and the line orthogonal to the line in the longitudinal direction of the link (Z axis) orthogonal to a straight line (X axis), when the belt is straight. When the belt is wound around the pulley, each link is pivoted and, because the respective divided pins are held with the plate, the pins are rotated through the same angle. The divided pin 26b on the front side in the direction of movement of the belt is rotated in the positive direction. In general, the divided pin 26b at the front side is mounted so as to incline in advance, rotating through a predetermined angle to the left (in the positive direction), in consideration of the fact that the contact point transmitting the load between a pair of divided pins moves in the positive direction on the Y axis. The divided pin 26a on the rear side in the moving direction of the belt is inclined at a predetermined angle to the right (in the negative direction). Both divided pins 26b, 26a are arranged with mirror symmetry to sit within the sheet hole 30a of the link plate 25.

In FIG. 30, the effective diameter of the pulley is the minimum a, and the variation ηa of the rotational angle at the minimum diameter a from the link attaching angle f is the limit for the rotational angle of the pin. In FIG. 30, the R shape radius of the pin end face is Rp=10 mm, and this figure shows the X coordinates at $Y_0$=0. As known from FIG. 30, the displacement a, i.e., the distance of the center of the radius Rp from the rotational center of the pin, which is the smallest variation of the pin effective length within the above-mentioned range η a of rotational angle through which the pin rotates, is on the position where the variation ε of the pin length which causes the discrepancy a of the center of the radius Rp is equally distributed in its positive (+) rotational direction and in the negative (−) rotational direction (is not always a positive value or a negative value), and is on the line aA between the discrepancy 0 and an. The point aA can be calculated, such as by linear supplement, or determined from the graph of FIG. 30. The divided pin 26b rotates through the angle g in the negative direction (to the right) from the link attaching angle f being in a straight line state. The variation ε of the pin length is, about 1.7μboth in the positive rotational direction and in the negative rotational direction.

FIG. 31 is a view similar to FIG. 30 and illustrates the case where the effective diameter of the pulley is the maximum diameter b. In the case of the maximum diameter b, the variation η of the rotational angle of the pin is ηb, and the variation ηb of the rotational angle from the link attaching angle f of the pin is within the bounds of the rotational angle through which the pin rotates. The distance ("discrepancy") aA, corresponding to the smallest variation of the pin length, is the same as the variation of the pin length at the link attaching angle f on the positive rotation side limit of the rotational angle through which the pin rotates, similar to the case of the variation ηa in the case of value a for the smallest effective diameter of the pulley. The variation of the pin length aA on the negative rotation side is almost 0. The optimum aA poses no problem when the effective diameter of the pulley is the maximum value. At the maximum effective diameter, the divided pin rotates from the link attaching angle f to the angle h which is a positive value.

The optimum shape of the pin end face is an arc (R) shape along the X axis. The radius Rp of the R shape is preferably within the range of 5–15 mm since the problem of reduction of strength by Hertz stress becomes difficult outside that range. Most preferably, Rp is about 10 mm. By making the pin end face the R shape, the variation in clearance δ between the pin end face and the sheave with change of the rotational angle of the pin, that is, the variation of the pin effective length while abutting the sheave is through an extremely small range. Furthermore, when the R shape of the pin end face and the center of the radius Rp are shifted distance a from the rotational center 0 of the pin, the curve drawn by the variation ε of the pin length, through the rotational angle θ of each pin, has a minimum value on the negative (−) side. Therefore, the distance a ("discrepancy") between the center of the arc (R) shape of the pin end face and the rotational center of the pin is determined in such a manner that the variation of the pin length is equally distributed on the positive rotation side and the negative rotation side, especially at the smallest effective diameter of the pulley wherein the range of the rotational angle through which the pin rotates is wide, so as to minimize the variation of the pin length within that range, and thereby optimizing the shape of the pin end face.

For example, with a link pitch of 8 mm, when the smallest effective diameter of the pulley (at the smallest radius $R_0$ from the center of the pulley to the center line of the pin $Y_0=0$) is 28.2 mm and the maximum effective diameter b of the pulley is 68.8 mm, the variation ηa of the rotational angle at the smallest effective diameter a is 8.1°, and the variation ηb of the rotational angle at the largest effective diameter b is 3.3°. If the link attaching angle f of the pin is 5°, the discrepancy aA, corresponding to the smallest value of the variation μ of the pin length which is about 1.7μ, is 0.03 mm. The rotational angle g of the pin on the negative side (after biting into the pulley), at the smallest effective diameter of the pulley, is −3.1°, and the rotational angle h of the pin on the negative side (after biting into the pulley), at the maximum effective diameter of the pulley, is 1.7°.

If the above-mentioned distance ("discrepancy") a is set less than 0.2 mm, the variation of the pin length is restricted to the specified range presenting no problem in use. Since in the rear side divided pin 26a (rear side in the direction of movement of the link 25), the link attaching angle is in the negative (−) direction (the right rotation direction with respect to Y axis), a is less than −0.2 mm. Then, the X coordinates for a are is within the bounds of +0.2−0.2 mm.

When a is zero, the variation in the pin length of the front side divided pin 26b within the range of change of the rotational angle of the pin, is maximum (the same as the link plate attaching angle of the pin) at the position where the belt starts to bite into the pulley, and becomes smaller with further rotation of the pin. As a result, the variation of the pin length is made larger within the range of the change of the rotational angle of the pin. Where a is not 0, that is, the rotational center of the pin and the center (X coordinates) of the radius of the R shape of the pin end face do not correspond with each other, the variation of the pin length can be restricted to the smaller value within the range of the change of the rotational angle of the pin. The direction of the shift is determined by the link plate attaching angle of the pin on the positive side (to the right) or on the negative side (to the left) with respect to the Y axis defined by the center of the pulley. Therefore, the value a is preferably −0.2<ah <0.2, but does not include 0.

The loss accompanying the rotation of the pin itself when the pin bites into the sheave, the so-called spin loss, will now be explained with reference to FIGS. 32 and 33. From the viewpoint of spin loss, it is best that the value of the variation of the pin length with the rotation of the pin (both sides) (εμ the X value e mm), at the angle wherein the pin bites into the sheave (see FIG. 29) be as small as possible.

But, it is better to prioritize noise improvement when it is difficult to reconcile improvement of spin loss and reduction of noise.

Figure 32:
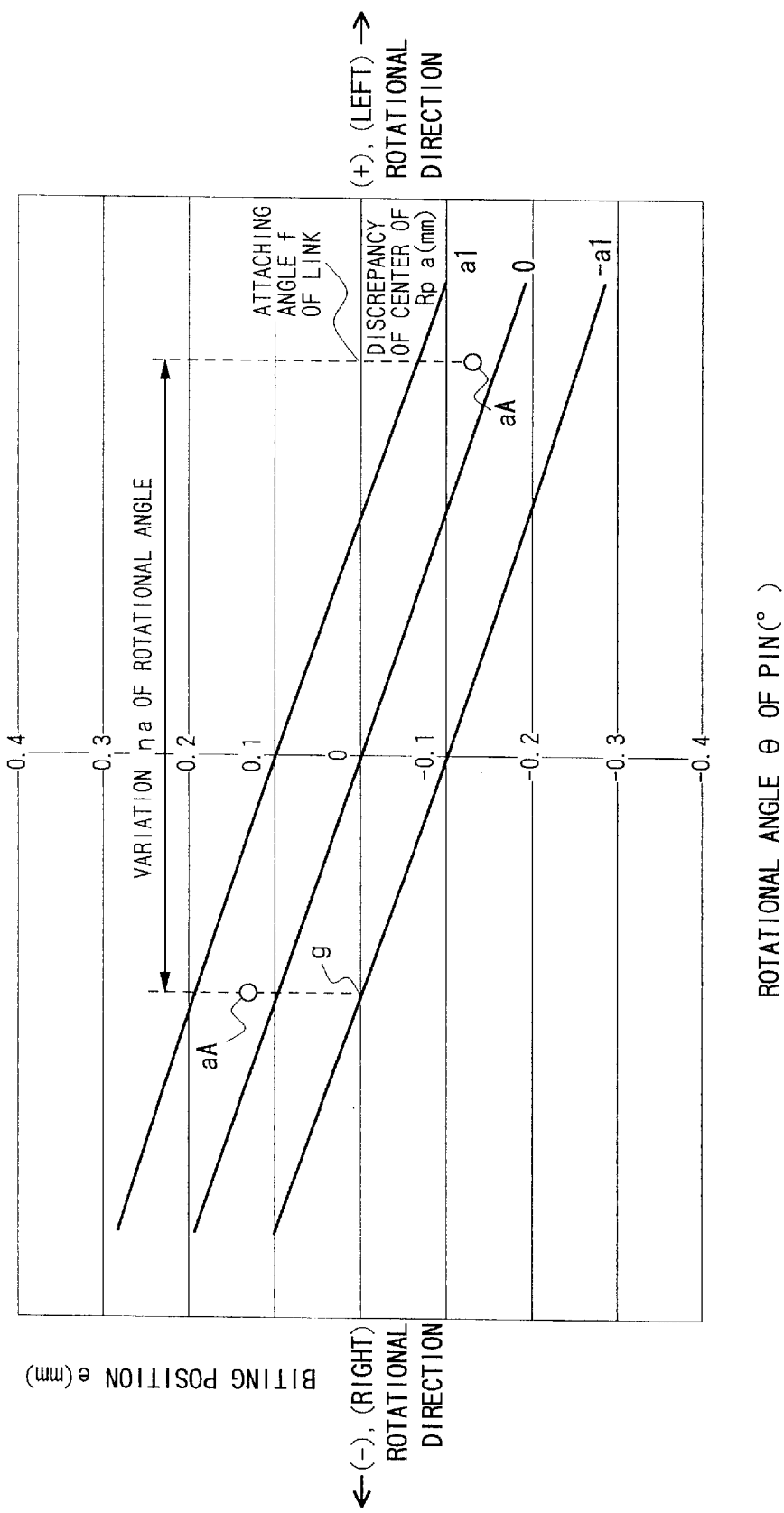
FIG. 32 is a graph of biting position versus the pin rotational angle for various values of the discrepancy a of the center of R shape of the end face of the pin when the effective diameter of the pulley is the minimum diameter.
Figure 33:
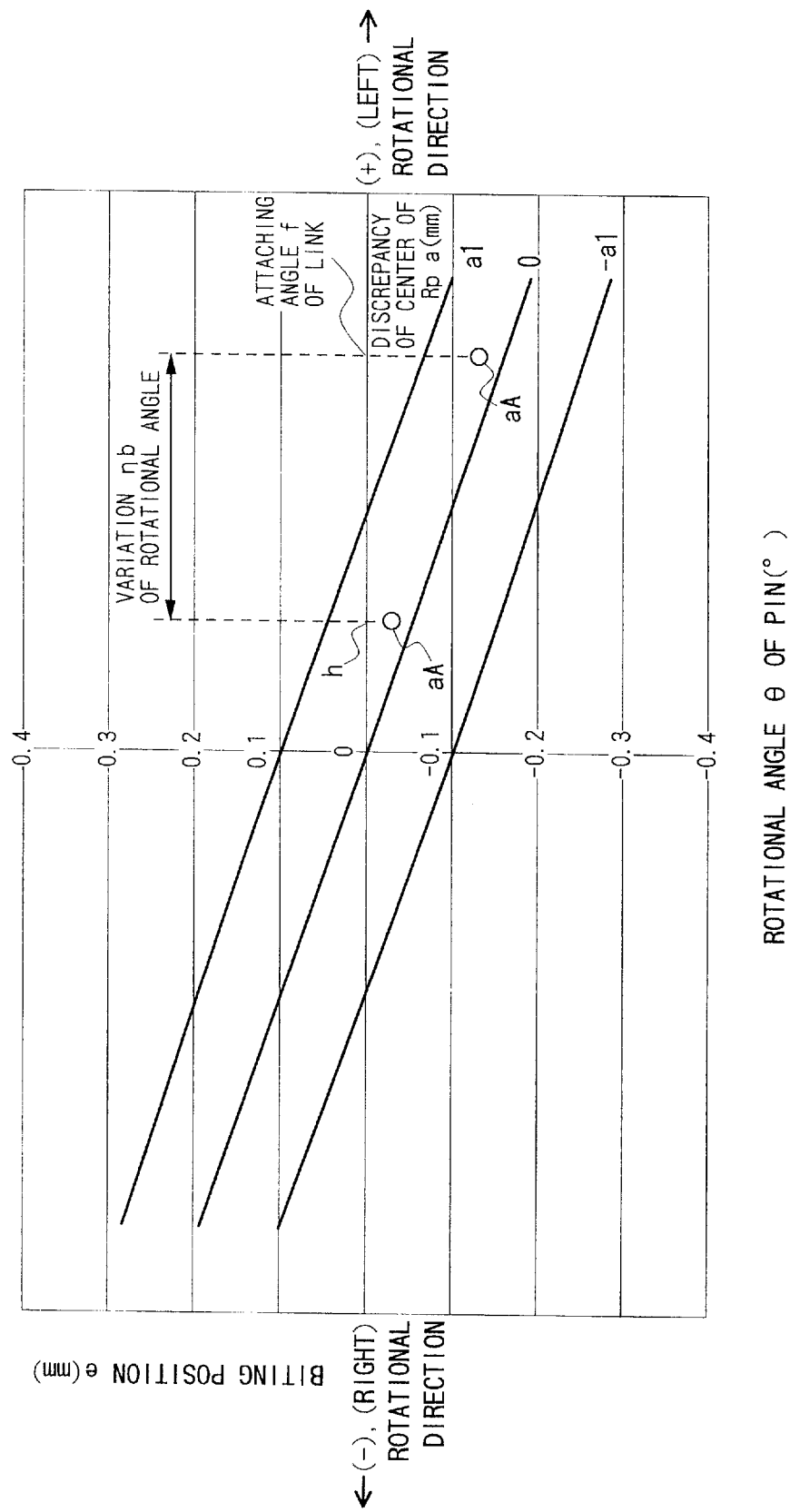
FIG. 33 is a view similar to FIG. 32 when the effective diameter of the pulley is the maximum diameter.

FIG. 32 and FIG. 33 are views showing the biting position on X coordinates at each rotational angle of the pin 0 with the "discrepancy" a mm of the center of the R shape of the pin end face as a parameter. FIG. 32 shows the case where the effective diameter of the pulley is the minimum diameter, and FIG. 31 shows the case where the effective diameter of the pulley is the maximum diameter. In both figures, the radius Rp of the R shape of the end face of the pin is 10 mm, and both figures are obtained with the X coordinates at $y_o=0$.

In FIG. 32 where the effective diameter of the pulley (the center of the pulley to the rotational center of the pin) is the minimum diameter, the biting position e of the pin is about −0.13 mm on the positive (+) rotation side of the rotational angle θ of the pin, and is about 0.12 mm on the negative (−) rotation side when the "discrepancy" a is aA in the range of variation ηa of the rotational angle of the pin (see FIG. 28). In FIG. 33 where the effective diameter of the pulley is the maximum diameter, the position e where the pin initially bites into the sheave is about −0.13 mm on the positive (+) rotation side of the rotational angle θ of the pin, and is about −0.03 mm on the negative (−) rotation side when the discrepancy is aA. Therefore, the spin loss value (εX ε)is from εX (0.012) to εX (−0.13) when the effective diameter of the pulley is the minimum, and is from εX (−0.03) to εX (−0.13) when the effective diameter of the pulley is the maximum. To be specific, the link attaching angle f=5°, the "discrepancy" aA between the center of the radius Rp of the R shape of the pin end face and the rotational center=0.03 mm, the minimum effective diameter of the pulley=28.2 mm, the variation ηa of the rotational angle at the minimum effective diameter=8.1°, the rotational angle g of the pin=−3.1°, the maximum effective diameter b of the pulley=68.8 mm, the variation ηb of the rotational angle at the maximum effective diameter 3.3°, and the rotational angle h of the pin=1.7°.

From the viewpoint of improvement in the spin loss, a pin end face with Rp=10 mm and a=0.03 mm is the optimum shape. However, the radius Rp of the R shape of the pin end face may be designed with the range of 5–15 mm, the "discrepancy" may be a <|0.2| mm but not 0.

The operation of the endless belt 21 will now be explained with reference to FIG. 3. When the endless belt 21 bites into the pulley, the divided pins 26a, 26b move relative to each other, with contact of their rolling surfaces 31a, each rank G . . . of the link chain 32 pivots, each block 22, 23 oscillates relative to the pin, and the first and the second blocks 22, 23 move relative to each other so as to mate with the sheave sides, with projecting portions 41 in contact with each other. By doing so, the respective divided pins 26a, 26b and the respective blocks 22, 23 are pivoted around the effective diameter of the pulley unit, that is, along the pitch (circle) P—P. While each block does not always face the central axial line of the pulley, only the projecting outer side faces 45 of each block contact the sheave sides near the pitch circle, and the divided pins 26a, 26b, arranged corresponding to these outer side faces 45, likewise contact the sheave sides. At the time the endless belt bites into the pulley, the projecting outer side face 45 of the second block 22, one divided pin 26b, the other divided pin 26a, and the projecting outer side face 45 of the first block 23 contact the sheave sides, in order, in one pitch (1 rank G . . . ) of the link chain 32. Therefore, even if the respective blocks 22, 23 are inclined relative to the Y-axis, the X-axis and/or the Z-axis, biting into the pulley starts. Thus, gearing pitch is made smaller, polygon effects are decreased, the sound of the biting into the pulley becomes a high frequency, and sound energy is decreased so as to decrease undesired noise.

Furthermore, in the present invention the block may be inclined in the front and rear direction, i.e., longitudinally of the belt, relative to the Y-axis). In the case of the conventional blocks 2, 3 as shown in FIG. 10, the block width W2 (see FIGS. 10(a) and 10(b)) with respect to the pulley is the front face width W3 (FIG. 1(b)) of the block 2, 3 and, in such a state that the blocks 2, 3 are not inclined in the manner shown in FIG. 10(a). But, by inclining the blocks, the amount A projects from the sides of the blocks increases the effective width W2 of the block, i.e., the amount A is added to the front face width W3 of FIGS. 1(a) and 1(b).

Since the outer side faces 2c, 3c of the conventional respective blocks are inclined faces designed to mate with the sheave sides over their entire Y axis dimension (in the radial direction), the portion contacting the pulley extends over all the outer side faces 2c, 3c. The width t of the portion contacting the pulley is the maximum dimension t in the longitudinal direction of the belt. The block width W2 is increased by the amount A when the thickness of the block is t, and the inclined angle is α, A=t·cos α, in comparison with the block having no inclination.

Figure 9D:
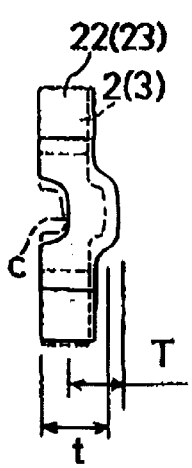
Figure 9E:
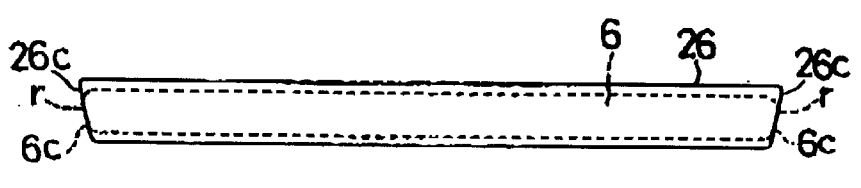
Figure 9F:
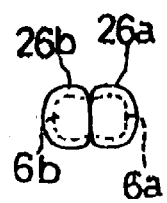

On the contrary, as shown in FIG. 7 and FIG. 10(b), the blocks 22, 23 according to the present invention contact the sheave sides only at the projecting outer side faces 45. Therefore, the inclination of the block in the front and rear direction influences only the effective thickness T at the projecting outer side faces 45, as shown in FIG. 9(d). Then, since it is not necessary to consider the thickness of the crank part, the thickness T of the portion contacting the pulley is smaller in comparison with the conventional block. Therefore, in comparison with the block having no inclination, the block width is changed C. But, the variation C is small (C<A) in comparison with the conventional design since the thickness of the portion contacting the pulley is small.

When the conventional blocks 2, 3 are inclined in the front and rear direction (with respect to the Y axis), the increase A of the block width W2 is large, and the load on the sheave is large, so this adversely influences the durability of the pulley and the block. But, in case of the blocks 22, 23 according to the present invention, the increase C in the block width is small and the load on the sheave is small, so that the influence on the durability of the pulley and the block is small.

When the pins 26a, 26b bite into the pulley, the respective divided pins 26a, 26b roll on their rolling surfaces 31 in contact with each other, and the leading pin 26b bites into the inside in the radius direction of the pulley. In this state, the relative clearance between the pin outer end face 6c and the sheave side is changed and the biting start position of the pin is shifted if both outer side end faces 6c are planar front to rear (in the longitudinal direction of the belt) as is the conventional pin 6. That is, the leading side of the pin outer end face 6c in the belt running direction first contacts the sheave side, and then, the biting pitch becomes bigger. On the contrary, the outer end face 26c of the pin 26 according to the present invention is curved through radius R front to rear (in the longitudinal direction of the belt). So, even if the pin 26b on the leading side is relatively rotated so as to bite radially inward in the pulley, the outer end face 26c always starts to contact the sheave side near the apical portion s of the curved face R, and the biting pitch is not enlarged.

Furthermore, when the belt 21 bites into the pulley, the abutting position between the opposed faces 31b of the pin pair 26a, 26b and the concave slot 40 of the blocks 22, 23 is slightly shifted from the pitch circle P—P outward, as shown in FIG. 3. Then, by abutting the projecting outer side face 45 of each block 22, 23 against the sheave sides, the force in the direction as shown by the arrow p (FIG. 3) acts on a position shifted from the center of the whole block (in the belt longitudinal direction), and produces a moment acting on the block. But, the moment acting on the block is counteracted by the force in the direction shown by the arrow E from the abutting position of the pins 26a, 26b so as to decrease the inclination of the block in the radial direction.

When the pins 26a, 26b bite into the pulley, the respective divided pins 26a, 26b both roll on their contacting, rolling surfaces with each other as previously described. The leading pin 26b bites first into the inside of the radius direction of the pulley. In this state, the relative clearance between the outer end face 6c of the pin and the side of the sheave is changed and the bite starting position of the pin is shifted if both outer end faces 6c are planar in the front to rear direction (the longitudinal direction of the belt) as is the conventional pin 6. That is, as shown in FIG. 15 through FIG. 18, the effective length (the relative clearance between the pin end face and the sheave) of the pin is widely changed by the rotation of the pin when the endless belt bites into the pulley if the shape of the end face of the pin is planar (flat face) or if planar in the X direction and R-shaped in the Y direction and the contact position between the pin and the sheave (in circumferential direction; X direction, radius direction; Y direction) is changed. Then, the polygon effects become bigger and the slip between the pin and the sheave, especially slip in the radial direction, becomes larger. So, the relative width between the projecting outer side faces 45 of the respective blocks 22, 23 contacting with the sheave and the pin is changed and the polygon effects increase so as to cause noise. At the same time, the load on the sheave, the block and the pin increases so as to increase wear of the belt-type continuously variable transmission.

On the contrary, with the end face of the pin according to the present invention R- shaped, in at least the X direction, and the center of the radius Rp of the R shape being shifted a predetermined distance aA with respect to the rotational center of the pin, the variation of the effective pin length with rotation of the pin is relatively small. Thus, the biting pitch of the pin end face into the sheave is maintained constant, the polygon effects remain small, and occurrence of noise is decreased. At the same time, the influence on the sheave by the rotational angle of the pin, and the influence on the block is decreased so as to improve the durability of the belt-type continuously variable transmission. Moreover, the spin loss of the pin is decreased so as to improve the power transmitting efficiency.

While the above-mentioned embodiments relate to the case where the projecting outer side faces 45 of the two blocks 22, 23 and divided pins 26a, 26b start to contact the sheave side at equal intervals in one pitch, in fact, the sound at the time of biting becomes white noise by changing frequency since the contacting position is slightly shifted by the curved face R of the pin outer end face 26c, thereby reducing noise. Furthermore, the projecting outer side faces 45 of the blocks 22, 23 and divided pins 26a, 26b may be designed so as to start contact at unequal intervals and the frequency may be changed so as to reduce white noise.

While the described embodiments relate to an endless belt wherein the first and the second blocks 22, 23 are held between pins 26. But, the shape of the pin end face according to the present invention is not so limited. For instance, the present invention can be applied to a Luk-type endless belt wherein only the pins contact the sheave, and furthermore, can be applied to the endless belts wherein the pins contact with the sides of the sheave in a similar manner. While the pin is preferably a divided pin, this invention is not so limited. The present invention can be also applied to one pin having a rolling surface contacting with the link (plate) as shown in Japanese patent publication gazette No. Tokukosho 58-49746, for instance. In short, the present invention can be applied to any endless belt having pins with rolling surfaces which rotate with the bending of the chain.

The embodiments which are described in the present specification are illustrative and not limiting. The scope of the invention is designated by the accompanying claims and is not restricted by the. descriptions of the specific embodiments. Accordingly, all the transformations and changes within the claims are included in the scope of the present invention.

What is claimed is:

1. An endless belt for power transmission with straight runs extending longitudinally between pulleys, said endless belt comprising:
    a plurality of divided pins comprising a pair of pins, the pins of each pair having rolling surfaces abutting each other, said divided pins having a shape and a length such that opposing end faces of each of said divided pins contact sheave sides of a pulley;
    a plurality of link plates alternately connected by said divided pins to form a link chain of parallel ranks of said link plates, and blocks, each of said blocks having:
        at least one longitudinally facing surface with a concave slot for holding one of said pin pairs in cooperation with the concave slot of an adjacent one of said blocks;
        a central opening receiving said link chain; and
        opposing, generally planar end face projections, said end face projections projecting transversely from block end faces at opposing sides of said link chain, said planar end face projections tapering together through an angle of inclination predetermined to provide mating with the sheave sides of the pulley, said planar end face projections being located near pitch line and having a shorter radial dimension than said concave slot; and
    wherein contact of one of said divided pins with the sheave sides is followed, in order, by contact with said planar end face projections of a trailing block having a concave slot holding said one pin.

2. The endless belt for power transmission as set forth in claim 1 wherein:
    said blocks are paired, with adjacent surfaces of the blocks of each pair facing each other having abutting projections;
    each of said blocks has said longitudinally facing surface opposite its adjacent surface; and
    a set of paired pins and the planar end faces of a pair of said blocks contact the sheave sides in one pitch of said link chain.

3. The endless belt for power transmission as set forth in claim 1, wherein said longitudinally facing surface has side portions transversely separated on opposing sides of said central opening and wherein said concave slot is formed in both of said side portions.

4. The endless belt for power transmission as set forth in claim 3, wherein said central opening is the only opening extending through said block in a direction parallel to said belt.

5. The endless belt for power transmission as set forth in claim 4, wherein each of said side portions has guide faces protruding from opposing sides of said concave slot into said central opening and into abutting engagement with said link chain.

6. The endless belt for power transmission as set forth in claim 1, wherein said pin pair is oriented in said slot so that a moment developed by contact between said concave slot and said pin pair counteracts a moment on the block created by contact between the sheave sides and said end face projections.

7. The endless belt for power transmission as set forth in claim 6, wherein said pin pair abuts said concave slot at a position spaced from the pitch circle of said belt.

8. The endless belt for power transmission as set forth in claim 1, wherein said opposing end faces of said pins are curved in the longitudinal direction of said belt through a predetermined radius of curvature.

9. The endless belt for power transmission as set forth in claim 8, wherein said shape of said pin end faces is approximately cylindrical.

10. The endless belt for power transmission as set forth in claim 8, wherein the radius of curvature of said end faces is 5–15 mm.

11. The endless belt for power transmission as set forth in claim 10, wherein the center of said radius of curvature is longitudinally offset from the rotational center of said pin, in such a manner that variation of pin length and the clearances between said pin end faces and said sheave, in the belt longitudinal direction, is equally distributed to positive and negative rotational sides of the rotational angle through said divided pin rotates.

12. The endless belt for power transmission as set forth in claim 11, wherein said offset is −0.2 to +0.2 mm.

13. The endless belt for power transmission as set forth in claim 12, wherein said offset is not 0.

14. The endless belt for power transmission as set forth in claim 11, wherein said pair of pins is mounted within sheet holes formed in said link plates, and wherein a front side pin at a front side of said pair of pins, in direction of movement of said endless belt, is oriented relative to said link plate at a predetermined angle of positive rotation.

15. The endless belt for power transmission as set forth in claim 14, wherein the center of said radius of curvature of said front side pin is offset to the rear of said rotational center of said pin in the direction of movement of said endless belt.

16. The endless belt for power transmission as set forth in claim 15, wherein said radius of curvature is approximately 10 mm, and the longitudinal offset is approximately 0.03 mm.

17. The endless belt for power transmission as set forth in claim 1, further comprising stoppers for restricting degree of rotation of said pin pair relative to said block, said stoppers extending longitudinally from opposing sides of said concave slot on each of said side portions.

18. The endless belt for power transmission as set forth in claim 1, wherein said opposing end faces of said divided pin are each formed with a straight line profile as seen from said longitudinal direction of said belt, said straight line profiles of said opposing end faces tapering together radially inward.

* * * * *